United States Patent
Ohashi

(10) Patent No.: US 7,095,564 B2
(45) Date of Patent: Aug. 22, 2006

(54) ZOOM LENS, LENS UNIT, CAMERA AND PORTABLE INFORMATION TERMINAL DEVICE

(75) Inventor: Kazuyasu Ohashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 70 days.

(21) Appl. No.: 10/986,128

(22) Filed: Nov. 12, 2004

(65) Prior Publication Data

US 2005/0122596 A1 Jun. 9, 2005

(30) Foreign Application Priority Data

Nov. 14, 2003 (JP) .............................. 2003-386026

(51) Int. Cl.
*G02B 15/14* (2006.01)

(52) U.S. Cl. .................... 359/690; 359/684; 359/685; 359/716; 359/740; 359/785; 359/788

(58) Field of Classification Search ........ 359/684–685, 359/689, 690, 708, 716, 740, 785, 788
See application file for complete search history.

(56) References Cited

U.S. PATENT DOCUMENTS

| | | | |
|---|---|---|---|
| 5,153,779 A | 10/1992 | Ohashi | |
| 5,398,135 A | 3/1995 | Ohashi | |
| 5,576,891 A | 11/1996 | Ohashi | |
| 5,581,319 A | 12/1996 | Ohashi | |
| 5,617,254 A | 4/1997 | Ohashi | |
| 5,630,188 A | 5/1997 | Ohashi | |
| 5,687,401 A | 11/1997 | Kawamura et al. | |
| 5,734,508 A * | 3/1998 | Sato | 359/687 |
| 5,930,056 A | 7/1999 | Ohashi | |
| 5,978,150 A * | 11/1999 | Hamanishi et al. | 359/683 |
| 6,055,114 A * | 4/2000 | Ohtake | 359/676 |
| 6,215,599 B1 * | 4/2001 | Ohtake | 359/688 |
| 6,353,506 B1 | 3/2002 | Ohashi | |
| 6,441,968 B1 * | 8/2002 | Okayama et al. | 359/687 |
| 6,449,433 B1 * | 9/2002 | Hagimori et al. | 359/684 |
| 6,483,648 B1 * | 11/2002 | Yamanashi | 359/683 |
| 6,525,885 B1 | 2/2003 | Ohashi | |
| 6,556,356 B1 * | 4/2003 | Ohtake | 359/687 |
| 6,594,087 B1 * | 7/2003 | Uzawa et al. | 359/685 |
| 6,621,643 B1 * | 9/2003 | Sato | 359/687 |
| 6,631,034 B1 * | 10/2003 | Yamanashi | 359/684 |
| 6,747,818 B1 | 6/2004 | Ohashi et al. | |

(Continued)

FOREIGN PATENT DOCUMENTS

JP 11-109236 4/1999

(Continued)

*Primary Examiner*—Evelyn A. Lester
(74) *Attorney, Agent, or Firm*—Oblon, Spivak, McClelland, Maier & Neustadt, P.C.

(57) ABSTRACT

A third group of lenses is constructed by subsequently arranging those four lenses from an object side to an image side which include a positive lens, a cemented lens of a positive lens and a negative lens, and a positive lens, both of a surface of the third group of the lenses nearest to the object side and a surface of the third group of the lenses nearest to the image side are so aspheric that positive refractive power becomes gradually weaker as a location of the third group of the lenses departs from an optical axis; and a following conditional formula is satisfied:

$$-0.5 < (Y' max/R_{34I}) < 0.0$$

where $R_{34I}$ is a curvature radius of the surface of the third group of the lenses nearest to the image side, and $Y'$ max is a maximum image height.

54 Claims, 12 Drawing Sheets

U.S. PATENT DOCUMENTS

| | | |
|---|---|---|
| 6,771,433 B1 | 8/2004 | Ohashi |
| 6,825,989 B1 * | 11/2004 | Uzawa et al. ............... 359/684 |
| 6,829,101 B1 * | 12/2004 | Mihara et al. .............. 359/687 |
| 2002/0060855 A1 | 5/2002 | Ohashi |
| 2002/0063970 A1 * | 5/2002 | Uzawa et al. ............... 359/689 |
| 2002/0067551 A1 * | 6/2002 | Ohtake ....................... 359/687 |
| 2002/0097503 A1 * | 7/2002 | Kohno et al. .............. 359/690 |
| 2004/0004772 A1 | 1/2004 | Ohashi et al. |
| 2004/0008420 A1 | 1/2004 | Ohashi |
| 2004/0136088 A1 | 7/2004 | Ohashi |
| 2004/0184160 A1 * | 9/2004 | Nishina et al. ............. 359/690 |
| 2005/0068637 A1 * | 3/2005 | Suzuki ....................... 359/689 |
| 2005/0122596 A1 * | 6/2005 | Ohashi ....................... 359/690 |

FOREIGN PATENT DOCUMENTS

| | | |
|---|---|---|
| JP | 11-142733 | 5/1999 |
| JP | 11-242157 | 9/1999 |

* cited by examiner

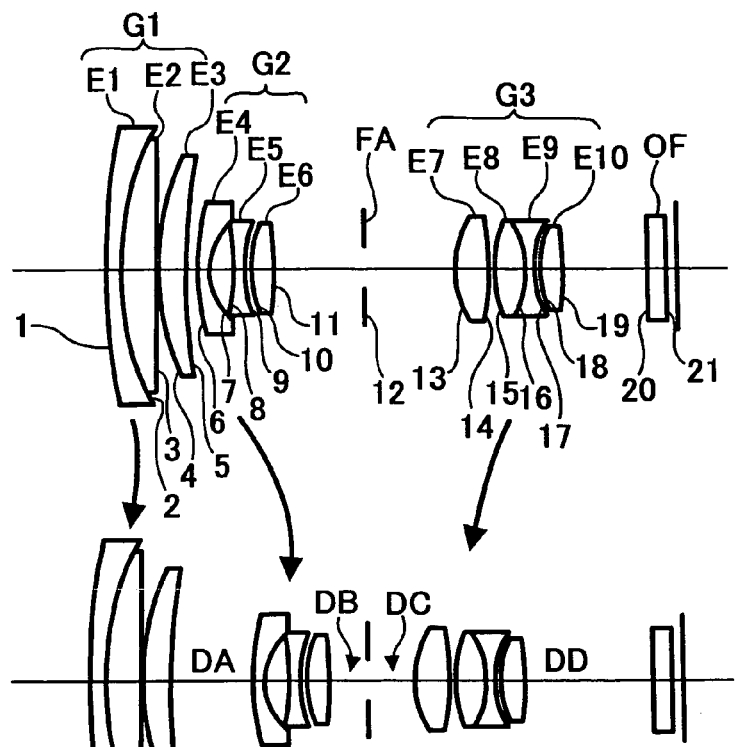
FIG. 1A
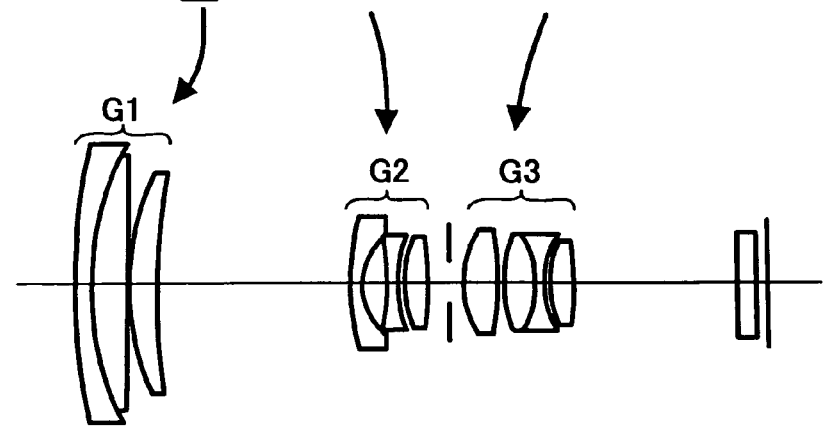
FIG. 1B
FIG. 1C

ZOOM LENS, LENS UNIT, CAMERA AND PORTABLE INFORMATION TERMINAL DEVICE

BACKGROUND OF THE INVENTION

1. Field of the Invention

The present invention relates to a zoom lens capable of selectively setting zooming to a desired focal length within a range of a predetermined focal length, and particularly, to a zoom lens aimed to achieve widening of a field angle of a wide-angle end and high magnification power in addition to miniaturization and improvement in performance, which is suitable for a camera utilizing an electrically imaging device such as a digital camera and a video camera, and to a lens unit, a camera and a portable information terminal device using such a zoom lens.

2. Description of the Related Art

A camera of a type that images an image of a subject to be photographed with a solid-state imaging device such as a CCD (Charge-Coupled Device) imaging device or the like, acquires image data of a static image (still image) or a motion image (movie image) of the subject thereby, and digitally stores the acquired image data into a nonvolatile semiconductor memory or the like represented by a flash memory, which is referred to as a digital camera or an electronic camera etc., has been generalized already. Such a type of camera is rapidly replacing a conventional type of camera utilizing a traditional silver salt film, more specifically, the silver salt camera.

A market for such a digital camera has been a very large one, and the user's demands for the digital camera have been ranged in scope. In particular, improvement in image quality and miniaturization of the digital camera are always the user's demand, and are of large interest of the user. Therefore, compatibility of improvement in performance and miniaturization is requested for a zoom lens used as a photographing lens as well.

In order to accomplish the miniaturization, it is necessary to shorten an overall length of lenses when in use, in other words, to shorten a distance from a lens surface which is nearest to an object side to an image plane, and also, it is important to reduce thickness of each group of lenses to curb the overall length at the time of storage. In addition, to accomplish the improvement in performance, it is necessary to secure resolving power corresponding to an imaging device having the number of pixels of at least 3 million to 5 million pixels or more throughout the entire zooming range.

Additionally, there are number of users who desire widening of a field angle of the photographing lens, so that it is desirable to provide a half field angle of a wide-angle end of the zoom lens to be more than 38 degrees. 38 degrees of the half field angle is equivalent to a focal length of 28 mm in terms of a 35 mm silver salt camera using a 35 mm size (so-called Leica size) silver salt film.

Furthermore, it has been desired that magnification power of zooming is as large as possible. It is considered to be possible to deal with most of the general photographing if a zoom lens has a focal length of worth 28 mm to 135 mm in terms of the 35 mm silver salt camera, and the magnification power of such a zoom lens is approximately 4.8 times. Accordingly, equivalent or higher magnification power with respect to such a zoom lens is desired in the digital camera as well.

Meanwhile, there are many types of zoom lenses which can be considered for the zoom lens to be used in the digital camera. A zoom lens having more than four groups of lenses has a tendency that total thickness of the entire lens systems becomes large, and consequently, there is a limit in shortening of the overall length of lenses and is not suitable for miniaturization, accordingly. Also, as a most general type of zoom lenses having magnification power of 3 times, there is a zoom lens comprising a first group of lenses having a negative focal length, a second group of lenses having a positive focal length and a third group of lenses having a positive focal length which are subsequently arranged from an object side to an image side, and having an aperture stop provided at the object side of the second group of the lenses that moves integrally with the second group of the lenses, and in accordance with changes in magnification power carried out from a short focal end to a long focal end, the second group of the lenses monotonously moves from the image side to the object side, and the first group of the lenses moves so as to correct fluctuation of an image plane position caused in accordance with the magnification power.

However, the zoom lens of such a structure is not suitable for attaining high magnification power exceeding magnification power of 4 times.

Within the zoom lenses of such a structure mentioned above, there is a type of zoom lenses, in which the number of group of lenses is three, which is less, and which is suitable for attaining relatively high magnification power, comprising a first group of lenses having a positive focal length, a second group of lenses having a negative focal length and a third group of lenses having a positive focal length which are subsequently arranged from an object side to an image side, and having an aperture stop provided between the second group of the lenses and the third group of the lenses, and in accordance with changes in magnification power carried out from a wide-angle end to a telephoto end, at least the first group of the lenses and the third group of the lenses are moved such that an interval between the first group of the lenses and the second group of the lenses becomes gradually larger and an interval between the second group of the lenses and the third group of the lenses becomes gradually smaller. The zoom lenses of such a type is, for reference, disclosed in JP-A H11-109236, JP-A H11-142733, JP-A H11-242157, etc.

More specifically, the zoom lens disclosed in JP-A H11-109236 has large magnification power of 10 times, but the half field angle in the wide-angle end is obtained only to the extent of 31 degrees, which is totally insufficient in terms of the widening of the field angle. Also, JP-A H11-142733 discloses an example of the zoom lens having the magnification power of 3 times to 5 times and in which the half field angle in the wide-angle end is 25 degrees to 34 degrees. However, according to the detailed example thereof, the variable ratio of only 3 times is maintained in an example in which a zoom lens having a relatively wide half field angle of 34 degrees in the wide-angle end is shown, which cannot be said that compatibility of the widening of the field angle and the achievement of the high magnification power is sufficient. The zoom lens disclosed in JP-A H11-242157 has the magnification power of 3 times to 6 times and is relatively compact in size, but similar to the case in JP-A H11-109236, the half field angle in the wide-angle end is maintained only to the extent of 31 degrees, which is, again, insufficient in terms of the widening of the field angle.

SUMMARY OF THE INVENTION

The present invention has been made in view of the above mentioned circumstances. Therefore, it is an object of the present invention to provide a zoom lens, which has a sufficient wide angle field in a wide-angle end and high magnification power capable of sufficiently covering a normal photographing range, which is small in size and has high resolving power, comprising a first group of lenses having a positive focal length, a second group of lenses having a negative focal length and a third group of lenses having a positive focal length which are subsequently arranged from an object side to an image side, and having an aperture stop provided between the second group of the lenses and the third group of the lenses, and in accordance with changes in magnification power as the zoom lens shifts from a wide-angle end to a telephoto end, at least the first group of the lenses and the third group of the lenses are moved such that an interval between the first group of the lenses and the second group of the lenses becomes gradually larger and an interval between the second group of the lenses and the third group of the lenses becomes gradually smaller, and to provide a lens unit, a camera and a portable information terminal device using such a zoom lens.

It is an object of a first aspect of the present invention to provide a zoom lens capable of, in particular, obtaining a sufficient wide angle field in which a half field angle of a wide-angle end is over 38 degrees, which has magnification power of over 4.5 times, small in size, and capable of obtaining resolving power corresponding to an imaging device having the number of pixels of more than 3 million to 5 million pixels.

It is an object of a second aspect of the present invention to provide a zoom lens capable of, in particular, obtaining high performance by compensating each aberration in a better manner.

It is an object of a third aspect of the present invention to provide a zoom lens capable of, in particular, obtaining higher performance by compensating off-axis aberration in a better manner that tends to be increased in accordance with widening of a field angle.

It is an object of a fourth aspect of the present invention to provide a zoom lens capable of, in particular, obtaining higher performance by compensating the off-axis aberration in even better manner.

It is an object of a fifth aspect of the present invention to provide a zoom lens capable of, in particular, obtaining a fine balance between monochromatic aberration and chromatic aberration to obtain even higher performance.

It is an object of a sixth aspect of the present invention to provide a zoom lens in which, in particular, imaging performance at a peripheral part is easy to secure, taking into account the sensitivity caused by a manufacturing error, and which is thereby capable of obtaining even higher performance.

It is an object of a seventh aspect of the present invention to provide a zoom lens of another structure capable of, in particular, obtaining a sufficient wide angle field in which a half field angle of a wide-angle end is over 38 degrees, which has magnification power of over 4.5 times, small in size, and capable of obtaining resolving power corresponding to an imaging device having the number of pixels of more than 3 million to 5 million pixels.

It is an object of an eighth aspect of the present invention to provide a zoom lens capable of obtaining higher performance by compensating the off-axis aberration in even better manner, in addition to the object of the seventh aspect of the present invention.

It is an object of a ninth aspect of the present invention to provide a zoom lens capable of, in particular, obtaining even higher performance by means of specific structure.

It is an object of a tenth aspect of the present invention to provide a zoom lens capable of, in particular, obtaining even higher performance by means of another specific structure.

It is an object of an eleventh aspect of the present invention to provide a zoom lens in which, in particular, a structure is simpler and which is capable of easily securing dynamic performance.

It is an object of a twelfth aspect of the present invention to provide a lens unit capable of, in particular, obtaining high performance by using the zoom lens of the above mentioned another structure capable of obtaining the sufficient wide angle field in which the half field angle of the wide-angle end is over 38 degrees, which has the magnification power of over 4.5 times, small in size, and capable of obtaining the resolving power corresponding to the imaging device having the number of pixels of more than 3 million to 5 million pixels.

It is an object of a thirteenth aspect of the present invention to provide a camera which is small in size and capable of, in particular, obtaining high image quality by means of high resolving power, by using the zoom lens capable of obtaining the sufficient wide angle field in which the half field angle of the wide-angle end is over 38 degrees, which has the magnification power of over 4.5 times, small in size, and capable of obtaining the resolving power corresponding to the imaging device having the number of pixels of more than 3 million to 5 million pixels.

It is an object of a fourteenth aspect of the present invention to provide a portable information terminal device which is small in size and capable of, in particular, obtaining high image quality by means of high resolving power, by using the zoom lens capable of obtaining the sufficient wide angle field in which the half field angle of the wide-angle end is over 38 degrees, which has the magnification power of over 4.5 times, small in size, and capable of obtaining the resolving power corresponding to the imaging device having the number of pixels of more than 3 million to 5 million pixels.

To accomplish the first object mentioned above, a zoom lens according to the present invention comprises a first group of lenses, a second group of lenses and a third group of lenses which are subsequently arranged from an object side to an image side; the first group of the lenses has a positive focal length, the second group of the lenses has a negative focal length and the third group of the lenses has a positive focal length; and an aperture stop provided between the second group of the lenses and the third group of the lenses, wherein at least the first group of the lenses and the third group of the lenses are moved in accordance with changes in magnification power as the zoom lens shifts from a wide-angle end to a telephoto end, such that an interval between the first group of the lenses and the second group of the lenses becomes gradually larger and an interval between the second group of the lenses and the third group of the lenses becomes gradually smaller, the third group of the lenses is constructed by subsequently arranging those four lenses from the object side to the image side which comprise a positive lens, a cemented lens of a positive lens and a negative lens, and a positive lens, both of a surface of the third group of the lenses nearest to the object side and a surface of the third group of the lenses nearest to the image side are so aspheric that positive refractive power becomes gradually weaker as a location of the third group of the lenses departs from an optical axis, and a following conditional formula is satisfied:

$$-0.5 < (Y\max/R_{34f}) < 0.0$$

where $R_{34I}$ is a curvature radius of the surface of the third group of the lenses nearest to the image side, and Y' max is a maximum image height.

Following are preferred embodiments (1) to (9) of the present invention, and any combinations thereof are considered to be preferred ones of the present invention unless any contradictions occur.

(1) A following conditional formula is satisfied:

$$-0.0250 < (N_{3O}-1) \times X_{3O}(H_{0.8})/Y' \text{ max} < -0.0005$$

$$-0.0500 < \{(N_{3O}-1) \times X_{3O}(H_{0.8}) + (1-N_{3I}) \times X_{3I}(H_{0.8})\}/Y' \text{ max} < -0.0010$$

where a refractive index of the lens positioned nearest to the object side of the third group of the lenses is $N_{3O}$, a refractive index of the lens positioned nearest to the image side of the third group of the lenses is $N_{3I}$, an aspheric surface quantity within 80% of a maximum light ray effective height in the aspheric surface which is nearest to the object side of the third group of the lenses is represented as $X_{3O}$ ($H_{0.8}$) and an aspheric surface quantity within 80% of a maximum light ray effective height in the aspheric surface which is nearest to the image side of the third group of the lenses is represented as $X_{3I}$ ($H_{0.8}$), provided that a difference in sag amount between a spherical surface defined by a paraxial curvature of an aspheric surface and an actual aspheric surface at a height H from the optical axis is represented by an aspheric surface quantity X (H), taking a direction from the object side to the image side positive.

(2) The second group of the lenses comprises at least two negative lenses and one positive lens, and both of a surface of the second group of the lenses nearest to the object side and a surface of the second group of the lenses nearest to the image side are so aspheric that negative refractive power becomes gradually weaker as a location of the second group of the lenses departs from the optical axis.

(3) A following conditional formula is satisfied:

$$0.0020 < (N_{2O}-1) \times X_{2O}(H_{0.8})/Y' \text{ max} < 0.1000$$

$$0.0030 < \{(N_{2O}-1) \times X_{2O}(H_{0.8}) + (1-N_{2I}) \times X_{2I}(H_{0.8})\}/Y' \text{ max} < 0.1500$$

where a refractive index of a lens positioned nearest to the object side of the second group of the lenses is $N_{2O}$, a refractive index of a lens positioned nearest to the image side of the second group of the lenses is $N_{2I}$, an aspheric surface quantity within 80% of a maximum light ray effective height in the aspheric surface which is nearest to the object side of the second group of the lenses is represented as $X_{2O}$ ($H_{0.8}$) and an aspheric surface quantity within 80% of a maximum light ray effective height in the aspheric surface which is nearest to the image side of the second group of the lenses is represented as $X_{2I}$ ($H_{0.8}$), provided that a difference in sag amount between a spherical surface defined by a paraxial curvature of an aspheric surface and an actual aspheric surface at a height H from the optical axis is represented by an aspheric surface quantity X (H), taking a direction from the object side to the image side positive.

(4) A following conditional formula is satisfied:

$$0.28 < (n_{33}-n_{32}) < 0.40$$

$$30.0 < (v_{32}-v_{33}) < 60.0$$

where a refractive index of the positive lens of the cemented lens of the third group of the lenses is $n_{32}$, a refractive index of the negative lens of the cemented lens of the third group of the lenses is $n_{33}$, an Abbe number of the positive lens of the cemented lens of the third group of the lenses is $v_{32}$, and an Abbe number of the negative lens of the cemented lens of the third group of the lenses is $v_{33}$.

(5) A following conditional formula is satisfied:

$$0.25 < (R_{31O}/R_{32O}) < 1.5$$

where a curvature radius of the object side surface of the positive lens positioned nearest to the object side of the third group of the lenses is $R_{31O}$, and a curvature radius of a surface of the cemented lens of the third group of the lenses nearest to the object side is $R_{32O}$.

In addition, in order to accomplish the above-mentioned object, a zoom lens according to the present invention comprises a first group of lenses, a second group of lenses and a third group of lenses which are subsequently arranged from an object side to an image side; the first group of the lenses has a positive focal length, the second group of the lenses has a negative focal length and the third group of the lenses has a positive focal length; and an aperture stop provided between the second group of the lenses and the third group of the lenses, wherein at least the first group of the lenses and the third group of the lenses are moved in accordance with changes in magnification power as the zoom lens shifts from a wide-angle end to a telephoto end, such that an interval between the first group of the lenses and the second group of the lenses becomes gradually larger and an interval between the second group of the lenses and the third group of the lenses becomes gradually smaller, the second group of the lenses comprises at least two negative lenses and one positive lens, and both of a surface of the second group of the lenses nearest to the object side and a surface of the second group of the lenses nearest to the image side are so aspheric that negative refractive power becomes gradually weaker as a location of the second group of the lenses departs from an optical axis.

(6) A following conditional formula is satisfied:

$$0.0020 < (N_{2O}-1) \times X_{2O}(H_{0.8})/Y' \text{ max} < 0.1000$$

$$0.0030 < \{(N_{2O}-1) \times X_{2O}(H_{0.8}) + (1-N_{2I}) \times X_{2I}(H_{0.8})\}/Y' \text{ max} < 0.1500$$

where a refractive index of a lens positioned nearest to the object side of the second group of the lenses is $N_{2O}$, a refractive index of a lens positioned nearest to the image side of the second group of the lenses is $N_{2I}$, an aspheric surface quantity within 80% of a maximum light ray effective height in the aspheric surface which is nearest to the object side of the second group of the lenses is represented as $X_{2O}$ ($H_{0.8}$) and an aspheric surface quantity within 80% of a maximum light ray effective height in the aspheric surface which is nearest to the image side of the second group of the lenses is represented as $X_{2I}$ ($H_{0.8}$), provided that a difference in sag amount between a spherical surface defined by a paraxial curvature of an aspheric surface and an actual aspheric surface at a height H from the optical axis is represented by an aspheric surface quantity X (H), taking a direction from the object side to the image side positive.

(7) The second group of the lenses is constructed by subsequently arranging three lenses from the object side to the image side, which are a negative lens facing a surface having a large curvature toward the image side, a negative lens facing a surface having a large curvature toward the image side, and a positive lens facing a surface having a large curvature toward the object side.

(8) The second group of the lenses is constructed by subsequently arranging three lenses from the object side to the image side, which are a negative lens facing a surface having a large curvature toward the image side, a positive lens facing a surface having a large curvature toward the image side, and a negative lens facing a surface having a large curvature toward the object side.

(9) A position of the aperture stop is fixed with respect to an image plane when the magnification power is carried out, and the second group of the lenses is moved in accordance with the magnification power.

Additionally, a camera according to the present invention comprises the zoom lens according to any one of the present inventions and any one of the embodiments (1) to (9) as a photographing optical system.

Moreover, a portable information terminal device of the present invention comprises the zoom lens according to any one of the present inventions and any one of the embodiments (1) to (9) as a photographing optical system of a camera function portion.

More specifically, the zoom lens according to the present invention comprises the first group of the lenses, the second group of the lenses and the third group of the lenses which are subsequently arranged from the object side to the image side; the first group of the lenses has the positive focal length, the second group of the lenses has the negative focal length and the third group of the lenses has the positive focal length; and the aperture stop provided between the second group of the lenses and the third group of the lenses, wherein at least the first group of the lenses and the third group of the lenses are moved in accordance with the changes in the magnification power as the zoom lens shifts from the wide-angle end to the telephoto end, such that the interval between the first group of the lenses and the second group of the lenses becomes gradually larger and the interval between the second group of the lenses and the third group of the lenses becomes gradually smaller, the third group of the lenses is constructed by subsequently arranging those four lenses from the object side to the image side which comprise the positive lens, the cemented lens of the positive lens and the negative lens, and the positive lens, both of the surface of the third group of the lenses nearest to the object side and the surface of the third group of the lenses nearest to the image side are so aspheric that positive refractive power becomes gradually weaker as the location of the third group of the lenses departs from the optical axis, and the following conditional formula is satisfied:

$$-0.5 < (Y' \max / R_{34I}) < 0.0$$

where $R_{34I}$ is the curvature radius of the surface of the third group of the lenses nearest to the image side, and Y' max is the maximum image height.

According to the present invention, it is possible to provide the zoom lens capable of, in particular, obtaining the sufficient wide angle field in which the half field angle of the wide-angle end is over 38 degrees, which has the magnification power of over 4.5 times, small in size, and capable of accomplishing miniaturization and obtaining high image quality by having the resolving power corresponding to the imaging device which has the number of pixels of more than 3 million to 5 million pixels, and in which a magnification power region is possible to cover the normal photographing range, sufficiently.

Also, the zoom lens of the embodiment (1), in accordance with the present invention, satisfies the following conditional formula:

$$-0.0250 < (N_{3O}-1) \times X_{3O}(H_{0.8})/Y' \max < -0.0005$$

$$-0.0500 < \{(N_{3O}-1) \times X_{3O}(H_{0.8}) + (1-N_{3I}) \times X_{3I}(H_{0.8})\}/Y' \max < -0.0010$$

where the refractive index of the lens positioned nearest to the object side of the third group of the lenses is $N_{3O}$, the refractive index of the lens positioned nearest to the image side of the third group of the lenses is $N_{3I}$, the aspheric surface quantity within 80% of the maximum light ray effective height in the aspheric surface which is nearest to the object side of the third group of the lenses is represented as $X_{3O}$ ($H_{0.8}$) and the aspheric surface quantity within 80% of the maximum light ray effective height in the aspheric surface which is nearest to the image side of the third group of the lenses is represented as $X_{3I}$ ($H_{0.8}$), provided that the difference in sag amount between the spherical surface defined by the paraxial curvature of the aspheric surface and the actual aspheric surface at the height H from the optical axis is represented by the aspheric surface quantity X (H), taking the direction from the object side to the image side positive.

According to this embodiment, it is possible to provide the zoom lens capable of, in particular, obtaining the high image quality by compensating each aberration in the better manner so as to be in the high performance.

According to the zoom lens of the embodiment (2), in addition to the present invention or the embodiment (1), the second group of the lenses comprises at least two negative lenses and one positive lens, and both of the surface of the second group of the lenses nearest to the object side and the surface of the second group of the lenses nearest to the image side are so aspheric that negative refractive power becomes gradually weaker as the location of the second group of the lenses departs from the optical axis.

According to this embodiment, it is possible to provide the zoom lens capable of, in particular, obtaining the high image quality in which degradation of image quality around a screen is less, by compensating the off-axis aberration in the better manner that tends to be increased in accordance with the widening of the field angle so as to be in higher performance.

The zoom lens of the embodiment (3), in accordance with the embodiment (2), satisfies the following conditional formula:

$$0.0020 < (N_{2O}-1) \times X_{2O}(H_{0.8})/Y' \max < 0.1000$$

$$0.0030 < \{(N_{2O}-1) \times X_{2O}(H_{0.8}) + (1-N_{2I}) \times X_{2I}(H_{0.8})\}/Y' \max < 0.1500$$

where the refractive index of the lens positioned nearest to the object side of the second group of the lenses is $N_{2O}$, the refractive index of the lens positioned nearest to the image side of the second group of the lenses is $N_{2I}$, the aspheric surface quantity within 80% of the maximum light ray effective height in the aspheric surface which is nearest to the object side of the second group of the lenses is represented as $X_{2O}$ ($H_{0.8}$) and the aspheric surface quantity within 80% of the maximum light ray effective height in the aspheric surface which is nearest to the image side of the second group of the lenses is represented as $X_{2I}$ ($H_{0.8}$), provided that the difference in sag amount between the spherical surface defined by the paraxial curvature of the aspheric surface and the actual aspheric surface at the height H from the optical axis is represented by the aspheric surface quantity X (H), taking the direction from the object side to the image side positive.

According to this embodiment, it is possible to provide to the zoom lens capable of, in particular, obtaining the high image quality by means of higher resolving power, by compensating the off-axis aberration in even better manner so as to be in the higher performance.

The zoom lens of the embodiment (4), in accordance with the present invention or any one of the embodiments (1) to (3), satisfies the following conditional formula:

$$0.28<(n_{33}-n_{32})<0.40$$

$$30.0<(v_{32}-v_{33})<60.0$$

where the refractive index of the positive lens of the cemented lens of the third group of the lenses is $n_{32}$, the refractive index of the negative lens of the cemented lens of the third group of the lenses is $n_{33}$, the Abbe number of the positive lens of the cemented lens of the third group of the lenses is $v_{32}$, and the Abbe number of the negative lens of the cemented lens of the third group of the lenses is $v_{33}$.

According to this embodiment, it is possible to provide the zoom lens capable of, in particular, obtaining high image quality in which color blurring is less even around the screen, by obtaining the fine balance between the monochromatic aberration and the chromatic aberration so as to be in even higher performance.

The zoom lens of the embodiment (5), in accordance with the present invention or any one of the embodiments (1) to (4), satisfies the following conditional formula:

$$0.25<(R_{31O}/R_{32O})<1.5$$

where the curvature radius of the object side surface of the positive lens positioned nearest to the object side of the third group of the lenses is $R_{31O}$, and the curvature radius of the surface of the cemented lens of the third group of the lenses nearest to the object side is $R_{32O}$.

According to this embodiment, it is possible to provide the zoom lens capable of, in particular, obtaining even higher image quality throughout the screen, by allowing the imaging performance at the peripheral part to be easily secured, taking into account the sensitivity caused by the manufacturing error, so as to be in even higher performance.

The zoom lens according to the present invention comprises the first group of the lenses, the second group of the lenses and the third group of the lenses which are subsequently arranged from the object side to the image side; the first group of the lenses has the positive focal length, the second group of the lenses has the negative focal length and the third group of the lenses has the positive focal length; and the aperture stop provided between the second group of the lenses and the third group of the lenses, wherein at least the first group of the lenses and the third group of the lenses are moved in accordance with the changes in the magnification power as the zoom lens shifts from the wide-angle end to the telephoto end, such that the interval between the first group of the lenses and the second group of the lenses becomes gradually larger and the interval between the second group of the lenses and the third group of the lenses becomes gradually smaller, the second group of the lenses comprises at least two negative lenses and one positive lens, and both of the surface of the second group of the lenses nearest to the object side and the surface of the second group of the lenses nearest to the image side are so aspheric that negative refractive power becomes gradually weaker as the location of the second group of the lenses departs from the optical axis.

According to this invention, it is possible to provide the zoom lens capable of, in particular, obtaining the sufficient wide angle field in which the half field angle of the wide-angle end is over 38 degrees, which has the magnification power of over 4.5 times, small in size, and capable of accomplishing the miniaturization and obtaining the high image quality by having the resolving power corresponding to the imaging device which has the number of pixels of more than 3 million to 5 million pixels, and in which the magnification power region is possible to cover the normal photographing range, sufficiently.

The zoom lens of the embodiment (6), in accordance with the present invention, satisfies the following conditional formula:

$$0.0020<(N_{2O}-1)\times X_{2O}(H_{0.8})/Y\max<0.1000$$

$$0.0030<\{(N_{2O}-1)\times X_{2O}(H_{0.8})+(1-N_{2I})\times X_{2I}(H_{0.8})\}/Y\max<0.1500$$

where the refractive index of the lens positioned nearest to the object side of the second group of the lenses is $N_{2O}$, the refractive index of the lens positioned nearest to the image side of the second group of the lenses is $N_{2I}$, the aspheric surface quantity within 80% of the maximum light ray effective height in the aspheric surface which is nearest to the object side of the second group of the lenses is represented as $X_{2O}(H_{0.8})$ and the aspheric surface quantity within 80% of the maximum light ray effective height in the aspheric surface which is nearest to the image side of the second group of the lenses is represented as $X_{2I}(H_{0.8})$, provided that the difference in sag amount between the spherical surface defined by the paraxial curvature of the aspheric surface and the actual aspheric surface at the height H from the optical axis is represented by the aspheric surface quantity X (H), taking the direction from the object side to the image side positive.

According to this embodiment, it is possible to provide the zoom lens capable of, in particular, obtaining higher performance by compensating the off-axis aberration in even better manner.

According to the zoom lens of the embodiment (7), in addition to any one of the present inventions or any one of the embodiments (1) to (6), the second group of the lenses is constructed by subsequently arranging three lenses from the object side to the image side, which are the negative lens facing the surface having the large curvature toward the image side, the negative lens facing the surface having the large curvature toward the image side, and the positive lens facing the surface having the large curvature toward the object side.

According to this embodiment, it is possible to provide the zoom lens capable of, in particular, obtaining even higher image quality by the specific structure so as to be in even higher performance.

According to the zoom lens of the embodiment (8), in addition to any one of the present inventions or any one of the embodiments (1) to (6), the second group of the lenses is constructed by subsequently arranging three lenses from the object side to the image side, which are the negative lens facing the surface having the large curvature toward the image side, the positive lens facing the surface having the large curvature toward the image side, and the negative lens facing the surface having the large curvature toward the object side.

According to this embodiment, it is possible to provide the zoom lens capable of, in particular, obtaining even higher image quality by the another specific structure so as to be in even higher performance.

According to the zoom lens of the embodiment (9), in addition to any one of the present inventions or any one of the embodiments (1) to (8), the position of the aperture stop is fixed with respect to the image plane when the magnification power is carried out, and the second group of the lenses is moved in accordance with the magnification power.

According to this embodiment, it is possible to provide the zoom lens in which, in particular, the structure is simpler and which is capable of reducing image quality degrading factors caused at the time of being actually used, to obtain higher image quality, by enabling it to easily secure the dynamic performance.

Also, the camera according to the present invention comprises the zoom lens according to any one of the present inventions or any one of the embodiments (1) to (9) as the photographing optical system.

According to the present invention, it is possible to provide the camera which is, in particular, small in size and superior in portability, and capable of obtaining the high image quality by means of the high resolving power, by using the zoom lens capable of obtaining the sufficient wide angle field in which the half field angle of the wide-angle end is over 38 degrees, which has the magnification power of over 4.5 times, small in size, and capable of obtaining the resolving power corresponding to the imaging device having the number of pixels of more than 3 million to 5 million pixels.

Also, the portable information terminal device according to the present invention comprises the zoom lens according to any one of the present inventions or any one of the embodiments (1) to (9) as the photographing optical system of the camera function portion.

According to the present invention, it is possible to provide the portable information terminal device which is, in particular, small in size and superior in portability, and capable of obtaining the high image quality by means of the high resolving power, by using the zoom lens capable of obtaining the sufficient wide angle field in which the half field angle of the wide-angle end is over 38 degrees, which has the magnification power of over 4.5 times, small in size, and capable of obtaining the resolving power corresponding to the imaging device having the number of pixels of more than 3 million to 5 million pixels.

BRIEF DESCRIPTION OF THE DRAWINGS

The above and other objects, features and advantages of the present invention will become more apparent from the following description taken in connection with the accompanying drawings, in which;

FIGS. 1A to 1C are sectional views taken along an optical axis, for schematically showing a configuration of an optical system of a zoom lens according to a first embodiment of the present invention, in which FIG. 1A shows a state of a wide-angle end, FIG. 1B shows a state of an intermediate focal length, and FIG. 1C shows a state of a telephoto end;

FIGS. 2A to 2C are sectional views taken along the optical axis, for schematically showing a configuration of an optical system of a zoom lens according to a second embodiment of the present invention, in which FIG. 2A shows a state of the wide-angle end, FIG. 2B shows a state of the intermediate focal length, and FIG. 2C shows a state of the telephoto end;

FIGS. 3A to 3C are sectional views taken along the optical axis, for schematically showing a configuration of an optical system of a zoom lens according to a third embodiment of the present invention, in which FIG. 3A shows a state of the wide-angle end, FIG. 3B shows a state of the intermediate focal length, and FIG. 3C shows a state of the telephoto end;

FIGS. 4A to 4C are sectional views taken along the optical axis, for schematically showing a configuration of an optical system of a zoom lens according to a fourth embodiment of the present invention, in which FIG. 4A shows a state of the wide-angle end, FIG. 4B shows a state of the intermediate focal length, and FIG. 4C shows a state of the telephoto end;

FIGS. 17A and 17B are perspective views seen from an object side, for schematically showing an external structure of a camera according to an embodiment of the present invention, in which FIG. 17A shows a state in which a photographing lens is sunk and embedded in a body of the camera, and FIG. 17B shows a state in which the photographing lens is protruded from the body of the camera;

DESCRIPTION OF THE PREFERRED EMBODIMENTS

Figure 2A:
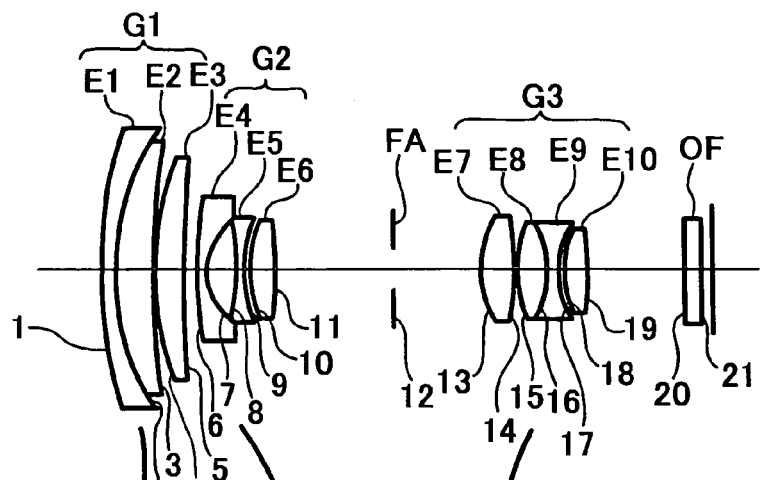

Hereinafter, a zoom lens, a lens unit, a camera and a portable information terminal device according to the present invention will be described in detail based on embodiments of the present invention, with referring to the accompanying drawings. Before describing the detailed embodiments, first of all, structures defined in the present inventions and the above-mentioned embodiments (1) to (9) and their functions will be explained, to describe principle embodiments of the present invention.

Each of the zoom lenses according to the present inventions and the embodiments (1) to (9) are zoom lenses, comprising a first group of lenses, a second group of lenses and a third group of lenses which are subsequently arranged from an object side to an image side; the first group of the lenses has a positive focal length, the second group of the lenses has a negative focal length and the third group of the lenses has a positive focal length; and an aperture stop provided between the second group of the lenses and the third group of the lenses, and at least the first group of the lenses and the third group of the lenses are moved in accordance with changes in magnification power as the zoom lens shifts from a wide-angle end to a telephoto end, such that an interval between the first group of the lenses and the second group of the lenses becomes gradually larger and an interval between the second group of the lenses and the third group of the lenses becomes gradually smaller, and, in addition, have following characteristics, respectively.

According to the zoom lens of the present invention, the third group of the lenses is constructed by subsequently arranging those four lenses from the object side to the image side which comprise a positive lens, a cemented lens of a positive lens and a negative lens, and a positive lens, both of a surface of the third group of the lenses nearest to the object side and a surface of the third group of the lenses nearest to the image side are so aspheric that positive refractive power becomes gradually weaker as a location of the third group of the lenses departs from an optical axis; and a following conditional formula is satisfied:

$$-0.5 < (Y\,max/R_{34I}) < 0.0$$

where $R_{34I}$ is a curvature radius of the surface of the third group of the lenses nearest to the image side, and Y' max is a maximum image height.

The zoom lens of the embodiment (1), in accordance with the present invention, satisfies the following conditional formula:

$$-0.0250 < (N_{3O}-1) \times X_{3O}(H_{0.8})/Y\,max < -0.0005$$

$$-0.0500 < \{(N_{3O}-1) \times X_{3O}(H_{0.8}) + (1-N_{3I}) \times X_{3I}(H_{0.8})\}/Y\,max < -0.0010$$

where a refractive index of the lens positioned nearest to the object side of the third group of the lenses is $N_{3O}$, a refractive index of the lens positioned nearest to the image side of the third group of the lenses is $N_{3I}$, an aspheric surface quantity within 80% of a maximum light ray effective height in the aspheric surface which is nearest to the object side of the third group of the lenses is represented as $X_{3O}$ ($H_{0.8}$) and an aspheric surface quantity within 80% of a maximum light ray effective height in the aspheric surface which is nearest to the image side of the third group of the lenses is represented as $X_{3I}$ ($H_{0.8}$), provided that a difference in sag amount between a spherical surface defined by a paraxial curvature of an aspheric surface and an actual aspheric surface at a height H from the optical axis is represented by an aspheric surface quantity X (H), taking a direction from the object side to the image side positive.

According to the zoom lens of the embodiment (2), in addition to the present invention or the embodiment (1), the second group of the lenses comprises at least two negative lenses and one positive lens, and both of a surface of the second group of the lenses nearest to the object side and a surface of the second group of the lenses nearest to the image side are so aspheric that negative refractive power becomes gradually weaker as a location of the second group of the lenses departs from the optical axis.

The zoom lens of the embodiment (3), in accordance with the embodiment (2), satisfies the following conditional formula:

$$0.0020 < (N_{2O}-1) \times X_{2O}(H_{0.8})/Y\,max < 0.1000$$

$$0.0030 < \{(N_{2O}-1) \times X_{2O}(H_{0.8}) + (1-N_{2I}) \times X_{2I}(H_{0.8})\}/Y\,max < 0.1500$$

where a refractive index of a lens positioned nearest to the object side of the second group of the lenses is $N_{2O}$, a refractive index of a lens positioned nearest to the image side of the second group of the lenses is $N_{2I}$, an aspheric surface quantity within 80% of a maximum light ray effective height in the aspheric surface which is nearest to the object side of the second group of the lenses is represented as $X_{2O}$ ($H_{0.8}$) and an aspheric surface quantity within 80% of a maximum light ray effective height in the aspheric surface which is nearest to the image side of the second group of the lenses is represented as $X_{2I}$ ($H_{0.8}$), provided that a difference in sag amount between a spherical surface defined by a paraxial curvature of an aspheric surface and an actual aspheric surface at a height H from the optical axis is represented by an aspheric surface quantity X (H), taking a direction from the object side to the image side positive.

The zoom lens of the embodiment (4), in accordance with the present invention or any one of the embodiments (1) to (3), satisfies the following conditional formula:

$$0.28 < (n_{33}-n_{32}) < 0.40$$

$$30.0 < (v_{32}-v_{33}) < 60.0$$

where a refractive index of the positive lens of the cemented lens of the third group of the lenses is $n_{32}$, a refractive index of the negative lens of the cemented lens of the third group of the lenses is $n_{33}$, an Abbe number of the positive lens of the cemented lens of the third group of the lenses is $\nu_{32}$, and an Abbe number of the negative lens of the cemented lens of the third group of the lenses is $\nu_{33}$.

The zoom lens of the embodiment (5), in accordance with the present invention or any one of the embodiments (1) to (4), satisfies the following conditional formula:

$$0.25<(R_{31O}/R_{32O})<1.5$$

where a curvature radius of the object side surface of the positive lens positioned nearest to the object side of the third group of the lenses is $R_{31O}$, and a curvature radius of a surface of the cemented lens of the third group of the lenses nearest to the object side is $R_{32O}$.

According to a zoom lens of the present invention, a second group of lenses comprises at least two negative lenses and one positive lens, and both of a surface of the second group of the lenses nearest to an object side and a surface of the second group of the lenses nearest to an image side are so aspheric that negative refractive power becomes gradually weaker as a location of the second group of the lenses departs from an optical axis.

The zoom lens of the embodiment (6), in accordance with the present invention, satisfies the following conditional formula:

$$0.0020<(N_{2O}-1)\times X_{2O}(H_{0.8})/Y\ max<0.1000$$

$$0.0030<\{(N_{2O}-1)\times X_{2O}(H_{0.8})+(1-N_{2I})\times X_{2I}(H_{0.8})\}/Y\ max<0.1500$$

where a refractive index of a lens positioned nearest to the object side of the second group of the lenses is $N_{2O}$, a refractive index of a lens positioned nearest to the image side of the second group of the lenses is $N_{2I}$, an aspheric surface quantity within 80% of a maximum light ray effective height in the aspheric surface which is nearest to the object side of the second group of the lenses is represented as $X_{2O}$ ($H_{0.8}$) and an aspheric surface quantity within 80% of a maximum light ray effective height in the aspheric surface which is nearest to the image side of the second group of the lenses is represented as $X_{2I}$ ($H_{0.8}$), provided that a difference in sag amount between a spherical surface defined by a paraxial curvature of an aspheric surface and an actual aspheric surface at a height H from the optical axis is represented by an aspheric surface quantity X (H), taking a direction from the object side to the image side positive.

According to the zoom lens of the embodiment (7), in addition to any one of the present inventions or any one of the embodiments (1) to (6), the second group of the lenses is constructed by subsequently arranging three lenses from the object side to the image side, which are a negative lens facing a surface having a large curvature toward the image side, a negative lens facing a surface having a large curvature toward the image side, and a positive lens facing a surface having a large curvature toward the object side.

According to the zoom lens of the embodiment (8), in addition to any one of the present inventions or any one of the embodiments (1) to (6), the second group of the lenses is constructed by subsequently arranging three lenses from the object side to the image side, which are a negative lens facing a surface having a large curvature toward the image side, a positive lens facing a surface having a large curvature toward the image side, and a negative lens facing a surface having a large curvature toward the object side.

According to the zoom lens of the embodiment (9), in addition to any one of the present inventions or any one of the embodiments (1) to (8), a position of the aperture stop is fixed with respect to an image plane when the magnification power is carried out, and the second group of the lenses is moved in accordance with the magnification power.

The lens unit according to the present invention comprises an optical system including the zoom lens according to any one of the present inventions or any one of the embodiments (1) to (9); and a mechanism for supporting each optical component structuring the optical system and moving the each optical component at least per group of the lenses.

The camera according to the present invention comprises the zoom lens according to any one of the present inventions or any one of the embodiments (1) to (9) as a photographing optical system.

The portable information terminal device according to any one of the present inventions comprises the zoom lens according to the present invention or any one of the embodiments (1) to (9) as a photographing optical system of a camera function portion.

Next, the embodiments defined in the present invention and in each of the embodiments (1) to (9) will be described in detail.

The zoom lens according to the present invention is in a positive-negative-positive three-group structure, and more specifically, comprises the first group of the lenses having the positive focal length, the second group of the lenses having the negative focal length and the third group of the lenses having the positive focal length, which are arranged subsequently from the object side to the image side, and also comprises the aperture stop which is provided between the second group of the lenses and the third group of the lenses. In such a zoom lens structured by the groups of lenses comprising the three groups of lenses of positive-negative-positive, generally the first group of the lenses moves from the image side to the object side in such a manner as to gradually depart from the second group of the lenses, and the third group of the lenses moves from the image side to the object side in such a manner as to gradually approach the second group of the lenses, in accordance with the changes in the magnification power as the zoom lens shifts from the wide-angle end to the telephoto end. A role of a function for carrying out the magnification power is shared by the second group of the lenses and the third group of the lenses, and the second group of the lenses and the third group of the lenses approach utmost with each other in the telephoto end, in such a manner that the aperture stop is sandwiched thereby.

In order to realize a zoom lens in which various aberrations are less and the resolving power is high, an aberration fluctuation caused by the magnification power has to be suppressed to be smaller, and particularly, it is necessary that the aberrations in the second group of the lenses and the third group of the lenses which are groups for carrying out the magnification power are compensated well in the entire area of the magnification power region. Furthermore, in order to accomplish such widening of a field angle in which a half field angle of the wide-angle end exceeds 38 degrees, compensation of off-axis aberration in the wide-angle end is the major problem and structures of the second group of the lenses and the third group of the lenses have to cope with it, accordingly. In particular, since the third group of the lenses has an imaging function as well, its structure is extremely important. Therefore, it may be considered to increase the number of lenses structuring the third group of the lenses, but the increase in the number of lenses enlarges thickness of the corresponding third group of the lenses in an optical axis direction, resulting that not only the sufficient miniaturization cannot be accomplished, but also causes increment in cost.

Given this factor, the present invention constitutes the third group of the lenses with four lenses which comprise the positive lens, the cemented lens of the positive lens and the negative lens, and the positive lens arranged subsequently from the object side to the image side, and both of the surface of the third group of the lenses nearest to the object side and the surface of the third group of the lenses nearest to the image side are in aspheric surfaces that the positive refractive power becomes gradually weaker as the location of the third group of the lenses departs from the optical axis. Within the third group of the lenses, because the aperture stop is adapted to be arranged at the object side of the third group of the lenses, an off-axis light ray goes through a place of the lens where it is away from the optical axis in lens surfaces that face the image side as going away from the aperture stop, making involvement of the third group of the lenses in the compensation the off-axis aberration deeper. By providing both of the surfaces in the third group of the lenses in which a manner of the light ray going through the lens is most different with each other to be such an aspheric surface as mentioned above, it is possible to reduce on-axis spherical aberration and off-axis astigmatism and coma aberration in a well balanced manner, enabling the sufficient widening of field angle and the high magnification power.

In addition, by sharing positive power in the object side between the two lenses while basically arranging the third group of the lenses in a symmetric figure of positive-negative positive power, generation of excessive aberration at one surface of the lens is avoided, and compatibility between reduction of an amount of aberration in the entire third group of lenses and reduction in sensitivity caused by manufacturing error is maintained. Furthermore, connection of the positive lens which is second from the object side and the negative lens which is third from the object side is effective in suppressing decentering caused by assembling and curtailment of assembling worker-hour.

Additionally, it is possible to attain sufficient compensation of aberration by satisfying the following conditional formula (corresponds to the present invention):

$$-0.5 < (Y' \max / R_{34I}) < 0.0$$

where $R_{34I}$ represents a curvature radius of the surface of the third group of the lenses nearest to the image side, and Y' max represents a maximum image height.

If $(Y' \max / R_{34I})$ is set to be less than −0.5, spherical aberration tends to be compensated insufficiently, and forced compensation of the spherical aberration in such a case with an aspheric surface or the like not only lacks a balance with other aberration, but also incurs increment in the sensitivity caused by the manufacturing error (decentering sensitivity). On the other hand, if $(Y' \max / R_{34I})$ is set to be over 0, an refracting angle of the off-axis light ray in the last surface of the third group of the lenses becomes too large, and particularly, large coma aberration is generated at off-axis of the wide-angle end and imaging performance at a peripheral part is deteriorated. More desirably, a following conditional formula may be satisfied:

$$-0.4 < (Y' \max / R_{34I}) < 0.1$$

The aspheric surfaces in the third group of the lenses are desirably set to be in such shapes that satisfy the following conditional formula (corresponds to the embodiment (1)):

$$-0.0250 < (N_{3O} - 1) \times X_{3O}(H_{0.8}) / Y' \max < -0.0005$$

$$-0.0500 < \{(N_{3O} - 1) \times X_{3O}(H_{0.8}) + (1 - N_{3I}) \times X_{3I}(H_{0.8})\} / Y' \max < -0.0010$$

where $N_{3O}$ represents a refractive index of the lens positioned nearest to the object side of the third group of the lenses, $N_{3I}$ represents a refractive index of the lens positioned nearest to the image side of the third group of the lenses, $X_{3O}(H_{0.8})$ represents an aspheric surface quantity within 80% of a maximum light ray effective height in the aspheric surface which is nearest to the object side of the third group of the lenses and $X_{3I}(H_{0.8})$ represents an aspheric surface quantity within 80% of a maximum light ray effective height in the aspheric surface which is nearest to the image side of the third group of the lenses. Here, a difference in sag amount between a spherical surface defined by a paraxial curvature of an aspheric surface and an actual aspheric surface at a height H from the optical axis is represented by an aspheric surface quantity X (H), taking a direction from the object side to the image side positive.

If $(N_{3O} - 1) \times X_{3O}(H_{0.8}) / Y' \max$ is set to be more than −0.0005, the spherical aberration tends to be compensated insufficiently, while setting $(N_{3O} - 1) \times X_{3O}(H_{0.8}) / Y' \max$ to be less than −0.0250 tends to make the compensation of spherical aberration excessive. Therefore, it is difficult to obtain fine imaging performance in both cases. In addition, if $\{(N_{3O} - 1) \times X_{3O}(H_{0.8}) + (1 - N_{3I}) \times X_{3I}(H_{0.8})\} / Y' \max$ is set to be more than −0.0010 or less than −0.0500, the spherical aberration and the astigmatism and the coma aberration cannot be compensated in a well balanced manner, making it difficult to sufficiently ensure off-axis performance in the wide-angle end, in particular. More desirably, a following conditional formula may be satisfied:

$$-0.0150 < (N_{3O} - 1) \times X_{3O}(H_{0.8}) / Y' \max < -0.0010$$

$$-0.0250 < \{(N_{3O} - 1) \times X_{3O}(H_{0.8}) + (1 - N_{3I}) \times X_{3I}(H_{0.8})\} / Y' \max < -0.0020$$

In the zoom lens of the present invention, it is desirable that the second group of the lenses as another group for carrying out the magnification power has, at least, two negative lenses and one positive lens, and both of the surface of the second group of the lenses nearest to the object side and the surface of the second group of the lenses nearest to the image side are so aspheric, that the negative refractive power becomes gradually weaker as the location of the second group of the lenses departs from the optical axis, in order to realize finer compensation of aberration (corresponds to the embodiment (2)). It is possible to correspond to the widening of the field angle sufficiently and to obtain the higher imaging performance in the peripheral part, by providing the surface of the second group of the lenses nearest to the object side to be the aspheric surface to mainly compensate distortion aberration in the wide-angle end and providing the surface of the second group of the lenses nearest to the image side to be the aspheric surface to mainly compensate the astigmatism and the coma aberration, while allowing flexibility in basic compensation of the aberration by means of constructing the second group of the lenses with a total of three lenses, which are two negative lenses and one positive lens.

The aspheric surfaces in the second group of the lenses are desirably set to be in such shapes that satisfy the following conditional formula (corresponds to the embodiment (3)):

$$0.0020 < (N_{2O}-1) \times X_{2O}(H_{0.8})/Y'\max < 0.1000$$

$$0.0030 < \{(N_{2O}-1) \times X_{2O}(H_{0.8}) + (1-N_{2I}) \times X_{2I}(H_{0.8})\}/Y'\max < 0.1500$$

where $N_{2O}$ represents a refractive index of a lens positioned nearest to the object side of the second group of the lenses, $N_{2I}$ represents a refractive index of a lens positioned nearest to the image side of the second group of the lenses, $X_{2O}(H_{0.8})$ represents an aspheric surface quantity within 80% of a maximum light ray effective height in the aspheric surface which is nearest to the object side of the second group of the lenses and $X_{2I}(H_{0.8})$ represents an aspheric surface quantity within 80% of a maximum light ray effective height in the aspheric surface which is nearest to the image side of the second group of the lenses.

It is undesirable if $(N_{2O}-1) \times X_{2O}(H_{0.8})/Y'$ max is set to be less than 0.0020 in that, compensation of the distortion aberration in the wide-angle end becomes insufficient or the aspheric surface becomes an unnatural shape having an inflection point.

On the other hand, if $(N_{2O}-1) \times X_{2O}(H_{0.8})/Y'$ max is set to be more than 0.1000, not only the compensation of the distortion aberration becomes excessive, but also well-mannered compensation of other off-axis aberration becomes difficult. In addition, if $\{(N_{2O}-1) \times X_{2O}(H_{0.8}) + (1-N_{2I}) \times X_{2I}(H_{0.8})\}/Y'$ max is set to be less than 0.0030 or more than 0.1500, the distortion aberration, the astigmatism and the coma aberration cannot be compensated in a well balanced manner, and in particular, it hinders ensuring of the high imaging performance in the wide-angle end. More desirably, a following conditional formula may be satisfied:

$$0.0040 < (N_{2O}-1) \times X_{2O}(H_{0.8})/Y'\max < 0.0500$$

$$0.0060 < \{(N_{2O}-1) \times X_{2O}(H_{0.8}) + (1-N_{2I}) \times X_{2I}(H_{0.8})\}/Y'\max < 0.0800$$

In order to carry out finer compensation of chromatic aberration, it is desirable to satisfy the following conditional formula (corresponds to the embodiment (4)):

$$0.28 < (n_{33} - n_{32}) < 0.40$$

$$30.0 < (v_{32} - v_{33}) < 60.0$$

where $n_{32}$ represents a refractive index of the positive lens of the cemented lens of the third group of the lenses, $n_{33}$ represents a refractive index of the negative lens of the cemented lens of the third group of the lenses, $v_{32}$ represents an Abbe number of the positive lens of the cemented lens of the third group of the lenses, and $v_{33}$ represents an Abbe number of the negative lens of the cemented lens of the third group of the lenses.

It is difficult to strike a balance between on-axis chromatic aberration and other aberration if $(n_{33}-n_{32})$ is less than 0.28 or if $(v_{32}-v_{33})$ is less than 30.0, and particularly, the on-axis chromatic aberration tends to occur in a long focal end. An attempt to forcedly reduce the on-axis chromatic aberration in this state apt to result that the chromatic aberration of magnification in the wide-angle end is collapsed, and additionally, an effect of compensation of monochromatic aberration in connected surfaces cannot be obtained sufficiently as well. On the other hand, it is advantageous in terms of the compensation of the aberration if $(n_{33}-n_{32})$ is more than 0.40 or if $(v_{32}-v_{33})$ is less more than 60.0, but such a glass material is expensive and will invite unnecessary increment in cost.

In order to reduce the decentering sensitivity within the third group of the lenses, it is desirable to satisfy the following conditional formula: (corresponds to the embodiment (5))

$$0.25 < (R_{31O}/R_{32O}) < 1.5$$

where $R_{31O}$ represents a curvature radius of the object side surface of the positive lens positioned nearest to the object side of the third group of the lenses, and $R_{32O}$ represents a curvature radius of a surface of the cemented lens of the third group of the lenses nearest to the object side.

If $(R_{31O}/R_{32O})$ is set to be less than 0.25, interaction of aberrations between the object side surface of the positive lens positioned nearest to the object side in the third group of the lenses and the image side surface of the negative lens in the third group of the lenses becomes too large, which makes the deterioration in the imaging performance caused by their relative decentering to be intense, and accordingly, difficulty in assembling increases.

On the other hand, the object side surface of the positive lens in the third group of the lenses positioned nearest to the object side does not contribute so much to the compensation of the aberration if $(R_{31O}/R_{32O})$ is set to be more than 1.5, resulting that an overall balance of the aberration tends to lack. When a priority is to be given to the reduction of the decentering sensitivity, a following conditional formula may be satisfied:

$$0.75 < (R_{31O}/R_{32O}) < 1.5$$

Meanwhile, it is also possible to accomplish the aforementioned object of the present invention by such a structure as described in the following, that is, by a zoom lens, comprising a first group of lenses, a second group of lenses and a third group of lenses which are subsequently arranged from an object side to an image side; the first group of the lenses having a positive focal length, the second group of the lenses having a negative focal length and the third group of the lenses having a positive focal length; and an aperture stop provided between the second group of the lenses and the third group of the lenses, wherein at least the first group of the lenses and the third group of the lenses are moved in accordance with changes in magnification power as the zoom lens shifts from a wide-angle end to a telephoto end, such that an interval between the first group of the lenses and the second group of the lenses becomes gradually larger and an interval between the second group of the lenses and the third group of the lenses becomes gradually smaller; the second group of the lenses comprises at least two negative lenses and one positive lens, and both of a surface of the second group of the lenses nearest to the object side and a surface of the second group of the lenses nearest to the image side are so aspheric that negative refractive power becomes gradually weaker as a location of the second group of the lenses departs from an optical axis (corresponds to the present invention).

In so doing, it is desirable that the aspheric surfaces of the second group of the lenses are in such shapes that satisfy the following conditional formula (corresponds to the embodiment (6)):

$$0.0020 < (N_{2O}-1) \times X_{2O}(H_{0.8})/Y'\max < 0.1000$$

$$0.0030 < \{(N_{2O}-1) \times X_{2O}(H_{0.8}) + (1-N_{2I}) \times X_{2I}(H_{0.8})\}/Y'\max < 0.1500$$

where $N_{2O}$ represents a refractive index of a lens positioned nearest to the object side of the second group of the lenses, $N_{2I}$ represents a refractive index of a lens positioned nearest to the image side of the second group of the lenses, $X_{2O}$ ($H_{0.8}$) represents an aspheric surface quantity within 80% of a maximum light ray effective height in the aspheric surface which is nearest to the object side of the second group of the lenses and $X_{2I}$ ($H_{0.8}$) represents an aspheric surface quantity within 80% of a maximum light ray effective height in the aspheric surface which is nearest to the image side of the second group of the lenses.

It is also possible to obtain such an effect of the compensation of the aberration mentioned above, only by the structure of the second group of the lenses, independently. The present invention, therefore, can be characterized from this point as well.

Hereinafter, explanation on a condition for carrying out finer compensation of the aberration as a zoom lens will be given.

The second group of the lenses is, desirably, constructed by subsequently arranging three lenses from the object side to the image side, which are a negative lens facing a surface having a large curvature toward the image side, a negative lens facing a surface having a large curvature toward the image side, and a positive lens facing a surface having a large curvature toward the object side (corresponds to the embodiment (7)), or constructed by subsequently arranging three lenses from the object side to the image side, which are a negative lens facing a surface having a large curvature toward the image side, a positive lens facing a surface having a large curvature toward the image side, and a negative lens facing a surface having a large curvature toward the object side (corresponds to the embodiment (8)). According to those constructions, since an aberration compensating capacity increases even more, it is further advantages in terms of the widening of field angle and the achievement of the high magnification power. Here, the second lens from the object side and the third lens from the object side may be appropriately connected.

The first group of the lenses is desirably in a construction having at least one negative lens and at least one positive lens subsequently arranged from the object side to the image side. In order to attain higher magnification power, it is more desirable that the first group of the lenses is constructed by subsequently arranging three lenses from the object side to the image side, which are a negative meniscus lens facing its convex surface toward the object side, a positive lens facing its strong convex surface toward the object side, and a positive lens facing its strong convex surface toward the object side. It is necessary to give strong power to the first group of the lenses to some extent in order to maintain compatibility of the achievement of high magnification power and the miniaturization, and such constructions mentioned above are most suitable for compensating various aberrations in the first group of the lenses.

The aperture stop is, desirably, fixed with respect to an image plane (corresponds to the embodiment (9)). Since a shutter is disposed at a position of the aperture stop, a shutter unit having an electrically connecting part utilizing FPC (Flexible Printed Circuit) or the like has to be moved if such a structure is employed in which the aperture stop moves when the magnification power is carried out, and thereby a problem raises that a structure of a lens barrel retaining the lenses so as to enable the zoom lens to operate becomes complicated. In such a case, the second group of the lenses is moved by necessity.

It is preferable to set an open diameter of the aperture stop to be constant regardless of the magnification power, due to the fact that this generally results to a mechanically simplified structure. However, it is also possible to reduce change in an F-number caused in accordance with the magnification power, by having the open diameter in the long focal end of the aperture stop to be larger than that of a short focal end. In addition, when it is necessary to reduce a light quantity that reaches the image plane, the aperture stop may be adapted to be small in diameter, but it is more preferable to reduce the light quantity by introducing a ND (Neutral Density) filter or the like without changing the aperture stop diameter as compared with such a way of changing the aperture stop diameter small, since deterioration in the resolving power caused by a diffraction phenomenon can be avoided.

By constructing the lens unit having an optical system utilizing such zoom lenses as mentioned above and a mechanism for supporting each optical component structuring the optical system and moving the each optical component at least per group of the lenses, it is possible to obtain the lens unit capable of obtaining a sufficient wide angle field in which a half field angle of the wide-angle end is over 38 degrees, which has the magnification power of over 4.5 times, small in size, and capable of accomplishing the miniaturization and obtaining high image quality by having the resolving power corresponding to an imaging device which has the number of pixels of more than 3 million to 5 million pixels (corresponds to the present invention).

If a structure of the camera is employed in which such a zoom lens or a lens unit utilizing the same as mentioned above is used as a photographing optical system, it is possible to obtain the camera which is small in size and superior in portability, and capable of obtaining the high image quality by means of the high resolving power, by using the zoom lens capable of obtaining the sufficient wide angle field in which the half field angle of the wide-angle end is over 38 degrees, which has the magnification power of over 4.5 times, small in size, and capable of obtaining the resolving power corresponding to the imaging device having the number of pixels of more than 3 million to 5 million pixels (corresponds to the present invention).

Also, if a structure of the portable information terminal device is employed in which such a zoom lens or a lens unit utilizing the same as mentioned above is used as a photographing optical system of a camera function portion, it is possible to obtain the portable information terminal device which is small in size and superior in portability, and capable of obtaining the high image quality by means of the high resolving power, by using the zoom lens capable of obtaining the sufficient wide angle field in which the half field angle of the wide-angle end is over 38 degrees, which has the magnification power of over 4.5 times, small in size, and capable of obtaining the resolving power corresponding to the imaging device having the number of pixels of more than 3 million to 5 million pixels (corresponds to the present invention).

First Embodiment

Next, specific embodiments which are based on the above mentioned present invention will be described in detail. First, second, third and fourth embodiments described hereinafter are embodiments of specific structures, which are on the basis of specific numeric values, of the zoom lens according to the present invention, and a fifth embodiment is an embodiment of the camera or the portable information terminal device according to the present invention which utilizes the lens unit structured by having the zoom lens shown in the first to fourth embodiments as the photographing optical system.

Structure of the zoom lens and its specific numeric values are shown in each of the first to fourth embodiments of the zoom lens according to the present invention. Meanwhile, a maximum image height is 3.50 mm in all of the embodiments.

In all of the first to fourth embodiments, both of the surface of the third group of the lenses nearest to the object side and the surface of the third group of the lenses nearest to the image side are in the aspheric surfaces, and among those embodiments, both of the surface of the second group of the lenses nearest to the object side and the surface of the second group of the lenses nearest to the image side are in the aspheric surfaces in the third and fourth embodiments. Although it is described in the first to fourth embodiments that the aspheric surfaces are constituted by having each of the lens surfaces to be in the aspheric surfaces directly such as so-called molded-aspheric surface lenses, the aspheric surfaces equivalent to that may be obtained by constituting an aspheric surface of a so-called hybrid-lens type in which an aspheric surface is formed by applying and attaching resin thin films onto a lens surface of a spherical lens.

In addition, in the first and second embodiments, the open diameter of the aperture stop is varied at the wide-angle end and the telephoto end. The open diameter of the aperture stop in the third and fourth embodiments is constant regardless of a zooming position.

The aperture stop is fixed with respect to the image plane in the first to third embodiments, while the aperture stop is moved in the fourth embodiment when the magnification power is carried out.

In each of the first to fourth embodiments, aberration is sufficiently corrected, thereby making it possible to correspond to the imaging device having the number of pixels of 3 million to 5 million pixels. It is evident from the first to fourth embodiments that very fine imaging performance can be ensured while sufficient miniaturization is achieved by structuring the zoom lens in accordance with the present invention.

Meanings of various signs used in the first to fourth embodiments are as follows:
f: Focal length of the entire system
F: F-number
ω: Half field angle
R: Curvature radius
D: Face interval
$N_d$: Refractive index (d represents lens numbers 1 to 10)
$v_d$: Abbe number (d represents lens numbers 1 to 10)
K: Conical constant of aspheric surface
$A_4$: Fourth-order aspheric surface coefficient
$A_6$: Sixth-order aspheric surface coefficient
$A_8$: Eighth-order aspheric surface coefficient
$A_{10}$: Tenth-order aspheric surface coefficient The aspheric surface used here is defined in the following formula:

(Formula 1)

$$X = \frac{CH^2}{1 + \sqrt{1-(1+K)C^2H^2}} + A_4 \cdot H^4 + A_6 \cdot H^6 + A_8 \cdot H^8 + A_{10} \cdot H^{10} \quad (1)$$

where a reciprocal of a paraxial curvature radius (paraxial curvature) is C and height from an optical axis is H.

FIGS. 1A to 1C show a configuration of an optical system of the zoom lens according to the first embodiment of the present invention, in which FIG. 1A shows a state of the wide-angle end, FIG. 1B shows a state of an intermediate focal length, and FIG. 1C shows a state of the telephoto end.

The zoom lens shown in FIGS. 1A to 1C is provided with a first lens E1, a second lens E2, a third lens E3, a fourth lens E4, a fifth lens E5, a sixth lens E6, a seventh lens E7, an eighth lens E8, a ninth lens E9, a tenth lens E10, an aperture stop FA as the aperture stop, and an optical filter OF. In this case, the first lens E1 to the third lens E3 structure a first group of lenses G1, the fourth lens E4 to the sixth lens E6 structure a second group of lenses G2, and the seventh lens E7 to the tenth lens E10 structure a third group of lenses G3. Each group of lenses is supported by an appropriate supporting frame or the like which is common in each group, and each group is operated integrally when zooming or the like is carried out. FIG. 1A also shows a surface number for each optical surface. Meanwhile, reference numerals used in the first embodiment are used independently with respect to the other embodiments, in order to avoid the explanation to be complicated due to increment in number of places of the reference numerals. Therefore, although the reference numerals common to those of FIGS. 2A to 4C are attached in FIGS. 1A to 1C, these do not necessarily represent the structures common to the other embodiments.

As shown in FIGS. 1A to 1C, for example, the first lens E1, the second lens E2, the third lens E3, the fourth lens E4, the fifth lens E5, the sixth lens E6, the aperture stop FA, the seventh lens E7, the eighth lens E8, the ninth lens E9, the tenth lens E10, and the optical filter OF, as the optical components structuring the optical system of the zoom lens, are subsequently arranged in this order from the side of object, such as a subject to be photographed, to the image side, and thereby an image of the subject is imaged behind the optical filter OF having various optical filtering functions.

The first lens E1 is a negative meniscus lens formed in a convex shape that faces its convex surface toward the object side and the second lens. E2 is a positive meniscus lens formed in a convex shape that faces its convex surface toward the object side, which are closely contacted and pasted together to be integrally connected, so as to form a cemented lens. In addition, the third lens E3 is a positive meniscus lens formed in a convex shape that faces its convex surface toward the object side. The first group of the lenses G1 structured by these first lens E1 to the third lens E3 has a positive focal length as a whole. The fourth lens E4 is a negative meniscus lens which is formed in a convex shape that faces its convex surface toward the object side and the surface facing toward the object side is formed in an aspheric surface, and at the same time, the surface facing toward the image side is formed in a strong concave surface. The fifth lens E5 is a negative lens constituted by a both concave lens in which a surface facing toward the image side is formed in a relatively strong concave surface, and the sixth lens E6 is a positive lens constituted by a both convex lens which faces its strong convex surface toward the object side. The second group of the lenses G2 structured by these fourth lens E4 to the sixth lens E6 has a negative focal length as a whole.

More specifically, the second group of the lenses G2 is structured by subsequently arranging the three lenses from the object side to the image side, which are the negative lens E4 facing its surface having a large curvature toward the image side, the negative lens E5 facing its surface having a large curvature toward the image side, and the positive lens E6 facing its surface having a large curvature toward the object side.

The seventh lens E7 is a positive lens constituted by a both convex lens that faces its strong convex surface constructed by an aspheric surface toward the object side. The eighth lens E8 is a positive lens constituted by a both convex lens that faces its strong convex surface toward the image side and the ninth lens E9 is a negative lens constituted by a both concave lens in which a surface facing toward the image side is in a relatively strong concave surface, which are closely contacted and pasted together to be integrally connected, so as to form a cemented lens. In addition, the tenth lens E10 is a positive lens constituted by a both convex lens which faces its strong convex surface toward the object side and in which a surface facing toward the image side is in an aspheric surface. The third group of the lenses G3 structured by these seventh lens E7 to the tenth lens E10 has a positive focal length as a whole. That is to say, the third group of the lenses G3 is constructed by subsequently arranging the four lenses from the object side to the image side which comprise the positive lens E7, the cemented lens of the positive lens E8 and the negative lens E9, and the positive lens E10, and both of the surface of the third group of the lenses nearest to the object side and the surface of the third group of the lenses nearest to the image side are in aspheric surfaces.

When the magnification power is carried out from the wide-angle end (i.e., short focal end) to the telephoto end (i.e., long focal end), variable intervals between each of the groups of lenses are varied. More specifically, an interval DA between a surface in the first group of the lenses G1 nearest to the image side, i.e. the surface of the third lens E3 facing toward the image side (surface number 5) and a surface in the second group of the lenses G2 nearest to the object side, i.e. the surface of the fourth lens E4 facing toward the object side (surface number 6), an interval DB between a surface in the second group of the lenses G2 nearest to the image side, i.e. the surface of the sixth lens E6 facing toward the image side (surface number 11) and a surface of the aperture stop FA (surface number 12), an interval DC between the surface of the aperture stop FA (surface number 12) and a surface in the third group of the lenses G3 nearest to the object side, i.e. the surface of the seventh lens E7 facing toward the object side (surface number 13), and an interval DD between a surface in the third group of the lenses G3 nearest to the image side, i.e. the surface of the tenth lens E10 facing toward the image side (surface number 19) and a surface of the optical filter OF facing toward the object side (surface number 20), are varied. Accordingly, the first group of the lenses G1, the second group of the lenses G2 and the third group of the lenses G3 are moved such that the interval DA between the first group of the lenses G1 and the second group of the lenses G2 becomes gradually larger and the intervals DB and DC between the second group of the lenses G2 and the third group of the lenses G3 become gradually smaller.

In this first embodiment, the focal length of the entire system "f", the F-number "F", and the half field angle "ω" are varied by the zooming within ranges of f=4.33–20.41, F=3.52–4.53 and ω=40.18–9.60, respectively. In this case, the open diameter of the aperture stop FA is varied when the zooming is carried out. The characteristics of each optical surface are shown in the table below.

TABLE 1

Optical characteristics

| Surface number | R | D | Nd | vd | Remarks | |
|---|---|---|---|---|---|---|
| 01 | 50.060 | 1.00 | 1.84666 | 23.78 | First lens | First group |
| 02 | 20.655 | 2.88 | 1.62299 | 58.12 | Second lens | |
| 03 | 157.656 | 0.10 | | | | |
| 04 | 19.698 | 2.16 | 1.83500 | 42.98 | Third lens | |
| 05 | 49.597 | Variable (DA) | | | | |
| 06* | 27.058 | 0.85 | 1.83500 | 42.98 | Fourth lens | Second group |
| 07 | 4.143 | 2.03 | | | | |
| 08 | −16.044 | 0.80 | 1.80420 | 46.50 | Fifth lens | |
| 09 | 9.968 | 0.43 | | | | |
| 10 | 9.067 | 1.80 | 1.80518 | 25.46 | Sixth lens | |
| 11 | −32.711 | Variable (DB) | | | | |
| 12 | Aperture stop | Variable (DC) | | | | |
| 13* | 6.138 | 2.72 | 1.58913 | 61.25 | Seventh lens | Third group |
| 14 | −18.910 | 0.26 | | | | |
| 15 | 14.410 | 2.34 | 1.48749 | 70.44 | Eighth lens | |
| 16 | −6.864 | 0.80 | 1.80610 | 33.27 | Ninth lens | |
| 17 | 6.438 | 0.22 | | | | |
| 18 | 7.959 | 1.86 | 1.58913 | 61.25 | Tenth lens | |
| 19* | −14.397 | Variable (DD) | | | | |
| 20 | ∞ | 1.50 | 1.51680 | 64.20 | Various filters | |
| 21 | ∞ | | | | | |

In Table 1, each of the optical surfaces shown by attaching "*" (asterisk) on their surface numbers, which are the sixth surface, the thirteenth surface and the nineteenth surface, are aspheric surfaces. The parameters of each of the aspheric surfaces with respect to the formula (1) are as follows:

Aspheric surface: Sixth Surface $K=0.0$, $A_4=1.61833\times10^{-4}$, $A_6=-5.01151\times10^{-6}$, $A_8=1.56340\times10^{-7}$, $A_{10}=-2.73133\times10^{-9}$ Aspheric surface: Thirteenth Surface $K=0.0$, $A_4=-3.84894\times10^{-4}$, $A_6=-3.10686\times10^{-6}$, $A_8=4.18913\times10^{-8}$, $A_{10}=-7.35190\times10^{-9}$ Aspheric surface: Nineteenth Surface $K=0.0$, $A_4=8.74485\times10^{-4}$, $A_6=3.31797\times10^{-5}$, $A_8=-1.34631\times10^{-6}$, $A_{10}=1.72647\times10^{-7}$ The variable interval DA between the first group of the lenses G1 and the second group of the lenses G2, the variable interval DB between the second group of the lenses G2 and the aperture stop FA, the variable interval DC between the aperture stop FA and the third group of the lenses, and the variable interval DD between the third group of the lenses and the optical filter OF are varied in accordance with the zooming as shown in the table below.

TABLE 2

| | Variable intervals | | |
|---|---|---|---|
| | Short focal end | Intermediate focal length | Long focal end |
| f | 4.326 | 9.398 | 20.414 |
| DA | 1.000 | 6.380 | 14.667 |
| DB | 7.185 | 2.913 | 1.740 |
| DC | 6.642 | 3.310 | 1.000 |
| DD | 6.368 | 9.713 | 12.021 |

In addition, numeric values in the first embodiment that relate to each of the conditional formulas mentioned in the foregoing are as follows:

Numeric Values of Conditional Formulas $$(Y'\max / R_{34I}) = -0.243$$

$$(N_{3O-1}) \times X_{3O}(H_{0.8}) / Y'\max = -0.00477$$

$$\{(N_{3O-1}) \times X_{3O}(H_{0.8}) + (1 - N_{3I}) \times X_{3I}(H_{0.8})\} / Y'\max = -0.01157$$

$$(n_{33} - n_{32}) = 0.319$$

$$(v_{32} - v_{33}) = 37.2$$

$$(R_{31O} / R_{32O}) = 0.426$$

Therefore, the numeric values in the first embodiment that relate to each of the conditional formulas mentioned in the foregoing are in the range of that conditional formulas.

Second Embodiment

Figure 2B:
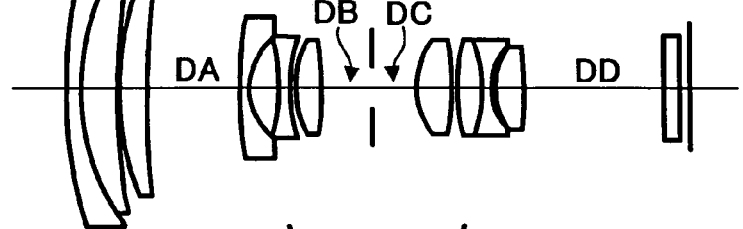
Figure 2C:
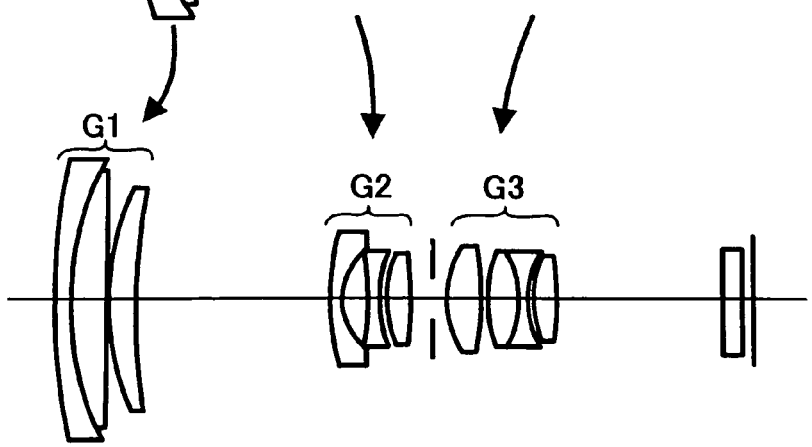

FIGS. 2A to 2C show a configuration of an optical system of a zoom lens according to the second embodiment of the present invention, in which FIG. 2A shows a state of the wide-angle end, FIG. 2B shows a state of the intermediate focal length, and FIG. 2C shows a state of the telephoto end.

The zoom lens shown in FIGS. 2A to 2C is provided with a first lens E1, a second lens E2, a third lens E3, a fourth lens E4, a fifth lens E5, a sixth lens E6, a seventh lens E7, an eighth lens E8, a ninth lens E9, a tenth lens E10, an aperture stop FA, and an optical filter OF. In this case, the first lens E1 to the third lens E3 structure a first group of lenses G1, the fourth lens E4 to the sixth lens E6 structure a second group of lenses G2, and the seventh lens E7 to the tenth lens E10 structure a third group of lenses G3. Each group of lenses is supported by an appropriate supporting frame or the like which is common in each group, and each group is operated integrally when the zooming or the like is carried out. FIG. 2A also shows a surface number for each optical surface. Meanwhile, reference numerals used in the second embodiment are used independently with respect to the other embodiments, in order to avoid the explanation to be complicated due to increment in number of places of the reference numerals. Therefore, although the reference numerals common to those of FIGS. 1A to 1C, and FIGS. 3A to 4C are attached in FIGS. 2A to 2C, these do not necessarily represent the structures common to the other embodiments.

As shown in FIGS. 2A to 2C, for example, the first lens E1, the second lens E2, the third lens E3, the fourth lens E4, the fifth lens E5, the sixth lens E6, the aperture stop FA, the seventh lens E7, the eighth lens E8, the ninth lens E9, the tenth lens E10, and the optical filter OF, as the optical components structuring the optical system of the zoom lens, are subsequently arranged in this order from the side of object, such as the subject to be photographed, to the image side, and thereby the image of the subject is imaged behind the optical filter OF having various optical filtering functions.

The first lens E1 is a negative meniscus lens formed in a convex shape that faces its convex surface toward the object side and the second lens E2 is a positive meniscus lens formed in a convex shape that faces its convex surface toward the object side, which are closely contacted and pasted together to be integrally connected, so as to form a cemented lens. In addition, the third lens E3 is a positive meniscus lens formed in a convex shape that faces its convex surface toward the object side. The first group of the lenses G1 structured by these first lens E1 to the third lens E3 has a positive focal length as a whole.

The fourth lens E4 is a negative meniscus lens which is formed in a convex shape that faces its convex surface toward the object side and the surface facing toward the object side is formed in an aspheric surface, and at the same time, the surface facing toward the image side is formed in a strong concave surface. The fifth lens E5 is a negative lens constituted by a both concave lens in which a surface facing toward the image side is formed in a relatively strong concave surface, and the sixth lens E6 is a positive lens constituted by a both convex lens which faces its strong convex surface toward the object side. The second group of the lenses G2 structured by these fourth lens E4 to the sixth lens E6 has a negative focal length as a whole. More specifically, the second group of the lenses G2 is structured by subsequently arranging the three lenses from the object side to the image side, which are the negative lens E4 facing its surface having a large curvature toward the image side, the negative lens E5 facing its surface having a large curvature toward the image side, and the positive lens E6 facing its surface having a large curvature toward the object side. The seventh lens E7 is a positive lens constituted by a both convex lens that faces its strong convex surface constructed by an aspheric surface toward the object side. The eighth lens E8 is a positive lens constituted by a both convex lens that faces its strong convex surface toward the image side and the ninth lens E9 is a negative lens constituted by a both concave lens in which a surface facing toward the image side is in a relatively strong concave surface, which are closely contacted and pasted together to be integrally connected, so as to form a cemented lens. In addition, the tenth lens E10 is a positive lens constituted by a both convex lens which faces its strong convex surface toward the object side and in which a surface facing toward the image side is in an aspheric surface. The third group of the lenses G3 structured by these seventh lens E7 to the tenth lens E10 has a positive focal length as a whole. That is to say, the third group of the lenses is constructed by subsequently arranging the four lenses from the object side to the image side which comprise the positive lens E7, the cemented lens of the positive lens E8 and the negative lens E9, and the positive lens E10, and both of the surface of the third group of the lenses nearest to the object side and the surface of the third group of the lenses nearest to the image side are in aspheric surfaces.

When the magnification power is carried out from the wide-angle end (i.e., short focal end) to the telephoto end (i.e., long focal end), variable intervals between each of the groups of lenses are varied. More specifically, an interval DA between a surface in the first group of the lenses G1 nearest to the image side, i.e. the surface of the third lens E3 facing toward the image side (surface number 5) and a surface in the second group of the lenses G2 nearest to the object side, i.e. the surface of the fourth lens E4 facing toward the object side (surface number 6), an interval DB between a surface in the second group of the lenses G2 nearest to the image side, i.e. the surface of the sixth lens E6 facing toward the image side (surface number 11) and a surface of the aperture stop FA (surface number 12), an interval DC between the surface of the aperture stop FA (surface number 12) and a surface in the third group of the lenses G3 nearest to the object side, i.e. the surface of the seventh lens E7 facing toward the object side (surface number 13), and an interval DD between a surface in the third group of the lenses G3 nearest to the image side, i.e. the surface of the tenth lens E10 facing toward the image side (surface number 19) and a surface of the optical filter OF facing toward the object side (surface number 20), are varied. Accordingly, the first group of the lenses G1, the second group of the lenses G2 and the third group of the lenses G3 are moved such that the interval DA between the first group of the lenses G1 and the second group of the lenses G2 becomes gradually larger and the intervals DB and DC between the second group of the lenses G2 and the third group of the lenses G3 become gradually smaller.

In this second embodiment, the focal length of the entire system "f", the F-number "F", and the half field angle "ω" are varied by the zooming within ranges of f=4.43–20.34, F=3.49–4.53 and ω=39.53–9.58, respectively. As well as in this case, the open diameter of the aperture stop FA is varied when the zooming is carried out. The characteristics of each optical surface are shown in the table below.

TABLE 3

Optical characteristics

| Surface number | R | D | Nd | vd | Remarks | |
|---|---|---|---|---|---|---|
| 01 | 34.440 | 1.00 | 1.84666 | 23.78 | First lens | First group |
| 02 | 18.209 | 2.76 | 1.60311 | 60.69 | Second lens | |
| 03 | 59.659 | 0.10 | | | | |
| 04 | 22.436 | 2.14 | 1.83500 | 42.98 | Third lens | |
| 05 | 76.003 | Variable (DA) | | | | |
| 06* | 39.870 | 0.85 | 1.83500 | 42.98 | Fourth lens | Second group |
| 07 | 4.581 | 2.17 | | | | |
| 08 | −19.304 | 0.80 | 1.83500 | 42.98 | Fifth lens | |
| 09 | 10.304 | 0.43 | | | | |
| 10 | 9.370 | 1.96 | 1.80518 | 25.46 | Sixth lens | |
| 11 | −30.846 | Variable (DB) | | | | |
| 12 | Aperture stop | Variable (DC) | | | | |
| 13* | 5.898 | 2.72 | 1.58913 | 61.25 | Seventh lens | Third group |
| 14 | −26.842 | 0.22 | | | | |
| 15 | 17.449 | 1.91 | 1.48749 | 70.44 | Eighth lens | |
| 16 | −11.553 | 0.80 | 1.80610 | 33.27 | Ninth lens | |
| 17 | 5.241 | 0.22 | | | | |
| 18 | 6.038 | 2.20 | 1.58913 | 61.25 | Tenth lens | |
| 19* | −16.584 | Variable (DD) | | | | |
| 20 | ∞ | 0.90 | 1.51680 | 64.20 | Various filters | |
| 21 | ∞ | | | | | |

Also in Table 3, each of the optical surfaces shown by attaching "*" (asterisk) on their surface numbers, which are the sixth surface, the thirteenth surface and the nineteenth surface, are aspheric surfaces. The parameters of each of the aspheric surfaces with respect to the formula (1) are as follows:

Aspheric surface: Sixth Surface
K=0.0,
$A_4=1.30534 \times 10^{-4}$,
$A_6=-2.88070 \times 10^{-6}$,
$A_8=5.27410 \times 10^{-8}$,
$A_{10}=-6.21120 \times 10^{-10}$
Aspheric surface: Thirteenth Surface
K=0.0,
$A_4=-4.32322 \times 10^{-4}$,
$A_6=-6.99562 \times 10^{-6}$,
$A_8=1.41453 \times 10^{-7}$,
$A_{10}=-1.61459 \times 10^{-8}$
Aspheric surface: Nineteenth Surface
K=0.0,
$A_4=8.57178 \times 10^{-4}$,
$A_6=1.44663 \times 10^{-5}$,
$A_8=7.86658 \times 10^{-7}$,
$A_{10}=5.51649 \times 10^{-9}$ The variable interval DA between the first group of the lenses G1 and the second group of the lenses G2, the variable interval DB between the second group of the lenses G2 and the aperture stop FA, the variable interval DC between the aperture stop FA and the third group of the lenses, and the variable interval DD between the third group of the lenses and the optical filter OF are varied in accordance with the zooming as shown in the table below.

TABLE 4

| | Variable intervals | | |
|---|---|---|---|
| | Short focal end | Intermediate focal length | Long focal end |
| f | 4.427 | 9.488 | 20.339 |
| DA | 1.000 | 6.885 | 14.591 |
| DB | 8.857 | 3.532 | 1.735 |
| DC | 6.436 | 3.449 | 1.000 |
| DD | 7.216 | 10.186 | 12.605 |

In addition, numeric values in the second embodiment that relate to each of the conditional formulas mentioned in the foregoing are as follows:

Numeric Values of Conditional Formulas $$(Y'\max / R_{34I}) = -0.211$$

$$(N_{3O-1}) \times X_{3O}(H_{0.8}) / Y'\max = -0.00567$$

$$\{(N_{3O-1}) \times X_{3O}(H_{0.8}) + (1 - N_{3I}) \times X_{3I}(H_{0.8})\} / Y'\max = -0.01234$$

$$(n_{33} - n_{32}) = 0.319$$

$$(v_{32} - v_{33}) = 37.2$$

$$(R_{31O} / R_{32O}) = 0.338$$

Therefore, the numeric values in the second embodiment that relate to each of the conditional formulas mentioned in the foregoing are in the range of that conditional formulas.

Third Embodiment

Figure 3A:
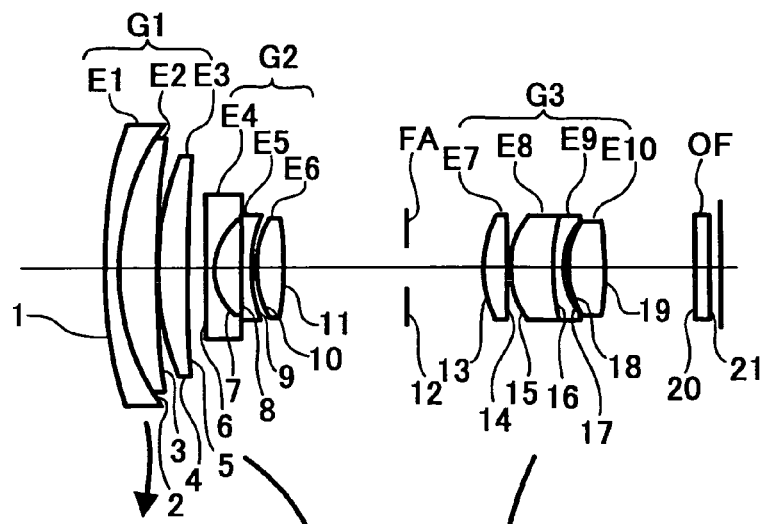
Figure 3B:
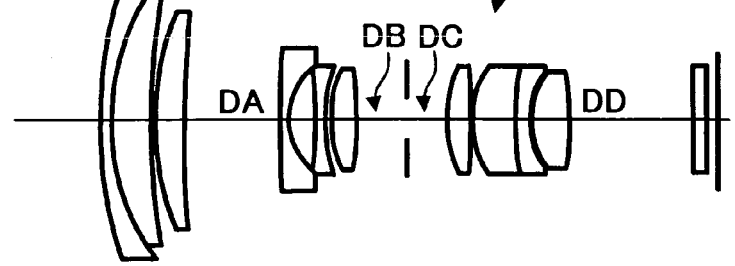
Figure 3C:
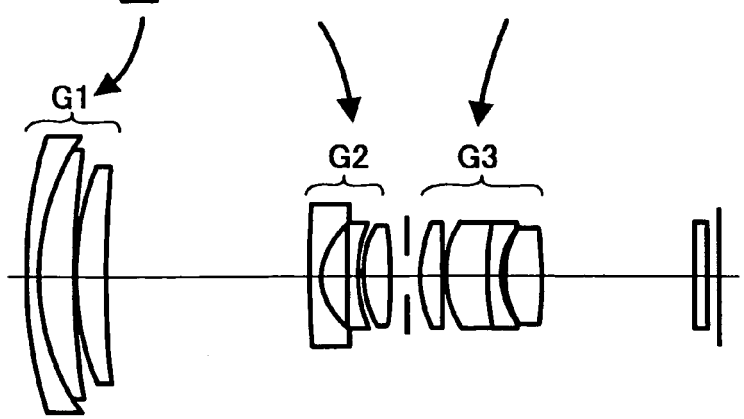

FIGS. 3A to 3C show a configuration of an optical system of a zoom lens according to the third embodiment of the present invention, in which FIG. 3A shows a state of the wide-angle end, FIG. 3B shows a state of the intermediate focal length, and FIG. 3C shows a state of the telephoto end.

The zoom lens shown in FIGS. 3A to 3C is provided with a first lens E1, a second lens E2, a third lens E3, a fourth lens E4, a fifth lens E5, a sixth lens E6, a seventh lens E7, an eighth lens E8, a ninth lens E9, a tenth lens E10, an aperture stop FA, and an optical filter OF. In this case, the first lens E1 to the third lens E3 structure a first group of lenses G1, the fourth lens E4 to the sixth lens E6 structure a second group of lenses G2, and the seventh lens E7 to the tenth lens E10 structure a third group of lenses G3. Each group of lenses is supported by an appropriate supporting frame or the like which is common in each group, and each group is operated integrally when the zooming or the like is carried out. FIG. 3A also shows a surface number for each optical surface. Meanwhile, reference numerals used in the third embodiment are used independently with respect to the other embodiments, in order to avoid the explanation to be complicated due to increment in number of places of the reference numerals. Therefore, although the reference numerals common to those of FIGS. 1A to 2C, and FIGS. 4A to 4C are attached in FIGS. 3A to 3C, these do not necessarily represent the structures common to the other embodiments.

As shown in FIGS. 3A to 3C, for example, the first lens E1, the second lens E2, the third lens E3, the fourth lens E4, the fifth lens E5, the sixth lens E6, the aperture stop FA, the seventh lens E7, the eighth lens E8, the ninth lens E9, the tenth lens E10, and the optical filter OF, as the optical components structuring the optical system of the zoom lens, are subsequently arranged in this order from the side of object, such as the subject to be photographed, to the image side, and thereby the image of the subject is imaged behind the optical filter OF having various optical filtering functions.

The first lens E1 is a negative meniscus lens formed in a convex shape that faces its convex surface toward the object side and the second lens E2 is a positive meniscus lens formed in a convex shape that faces its convex surface toward the object side, which are closely contacted and pasted together to be integrally connected, so as to form a cemented lens. In addition, the third lens E3 is a positive meniscus lens formed in a convex shape that faces its convex surface toward the object side. The first group of the lenses G1 structured by these first lens E1 to the third lens E3 has a positive focal length as a whole. The fourth lens E4 is a negative lens constituted by a both concave in which a surface facing toward the object side is formed in an aspheric surface and at the same time, the surface facing toward the image side is formed in a strong concave surface. The fifth lens E5 is a negative lens constituted by a both concave lens in which a surface facing toward the image side is formed in a relatively strong concave surface, and the sixth lens E6 is a positive lens constituted by a both convex lens which faces its strong convex surface toward the object side and in which a surface facing toward the object side is formed in an aspheric surface. The second group of the lenses G2 structured by these fourth lens E4 to the sixth lens E6 has a negative focal length as a whole. More specifically, the second group of the lenses G2 is structured by subsequently arranging the three lenses from the object side to the image side, which are the negative lens E4 facing its surface having a large curvature toward the image side, the negative lens E5 facing its surface having a large curvature toward the image side, and the positive lens E6 facing its surface having a large curvature toward the object side, and both of the surface of the second group of the lenses nearest to the object side and the surface of the second group of the lenses nearest to the image side are in aspheric surfaces.

The seventh lens E7 is a positive meniscus lens formed in a convex shape that faces its strong convex surface constructed by an aspheric surface toward the object side. The eighth lens E8 is a positive meniscus lens formed in a convex shape that faces its strong convex surface toward the object side and the ninth lens E9 is a negative meniscus lens formed in a convex shape that faces its convex surface toward the object side and in which a surface facing toward the image side is in a relatively strong concave surface, which are closely contacted and pasted together to be integrally connected, so as to form a cemented lens. In addition, the tenth lens E10 is a positive lens constituted by a both convex lens which faces its strong convex surface toward the object side and in which a surface facing toward the image side is in an aspheric surface. The third group of the lenses G3 structured by these seventh lens E7 to the tenth lens E10 has a positive focal length as a whole. That is to say, the third group of the lenses is constructed by subsequently arranging the four lenses from the object side to the image side which comprise the positive lens E7, the cemented lens of the positive lens E8 and the negative lens E9, and the positive lens E10, and both of the surface of the third group of the lenses nearest to the object side and the surface of the third group of the lenses nearest to the image side are in aspheric surfaces.

When the magnification power is carried out from the wide-angle end (i.e., short focal end) to the telephoto end (i.e., long focal end), variable intervals between each of the groups of lenses are varied. More specifically, an interval DA between a surface in the first group of the lenses G1 nearest to the image side, i.e. the surface of the third lens E3 facing toward the image side (surface number 5) and a surface in the second group of the lenses G2 nearest to the object side, i.e. the surface of the fourth lens E4 facing toward the object side (surface number 6), an interval DB between a surface in the second group of the lenses G2 nearest to the image side, i.e. the surface of the sixth lens E6 facing toward the image side (surface number 11) and a surface of the aperture stop FA (surface number 12), an interval DC between the surface of the aperture stop FA (surface number 12) and a surface in the third group of the lenses G3 nearest to the object side, i.e. the surface of the seventh lens E7 facing toward the object side (surface number 13), and an interval DD between a surface in the third group of the lenses G3 nearest to the image side, i.e. the surface of the tenth lens E10 facing toward the image side (surface number 19) and a surface of the optical filter OF facing toward the object side (surface number 20), are varied. Accordingly, the first group of the lenses G1, the second group of the lenses G2 and the third group of the lenses G3 are moved such that the interval DA between the first group of the lenses G1 and the second group of the lenses G2 becomes gradually larger and the intervals DB and DC between the second group of the lenses G2 and the third group of the lenses G3 become gradually smaller.

In this third embodiment, the focal length of the entire system "f", the F-number "F", and the half field angle "ω" are varied by the zooming within ranges of f=4.43–20.41, F=3.21–5.07 and ω=39.53–9.51, respectively. The open diameter of the aperture stop FA in this case is not varied when the zooming is carried out. The characteristics of each optical surface are shown in the table below.

TABLE 5

Optical characteristics

| Surface number | R | D | Nd | νd | Remarks | |
|---|---|---|---|---|---|---|
| 01 | 41.161 | 0.90 | 1.84666 | 23.78 | First lens | First |
| 02 | 19.891 | 2.78 | 1.62299 | 58.12 | Second lens | group |
| 03 | 84.365 | 0.10 | | | | |
| 04 | 22.692 | 2.13 | 1.83500 | 42.98 | Third lens | |

TABLE 5-continued

Optical characteristics

| Surface number | R | D | Nd | vd | Remarks | |
|---|---|---|---|---|---|---|
| 05 | 72.957 | Variable (DA) | | | | |
| 06* | −188.206 | 0.85 | 1.83500 | 42.98 | Fourth lens | Second group |
| 07 | 4.630 | 2.01 | | | | |
| 08 | −95.437 | 0.70 | 1.77250 | 49.62 | Fifth lens | |
| 09 | 11.017 | 0.53 | | | | |
| 10 | 10.460 | 1.85 | 1.80518 | 25.46 | Sixth lens | |
| 11* | −48.637 | Variable (DB) | | | | |
| 12 | Aperture stop | Variable (DC) | | | | |
| 13* | 9.091 | 1.80 | 1.58913 | 61.25 | Seventh lens | Third group |
| 14 | 156.328 | 0.10 | | | | |
| 15 | 7.238 | 3.19 | 1.48749 | 70.44 | Eighth lens | |
| 16 | 18.307 | 0.96 | 1.84666 | 23.78 | Ninth lens | |
| 17 | 5.402 | 0.21 | | | | |
| 18 | 6.110 | 2.93 | 1.48749 | 70.44 | Tenth lens | |
| 19* | −14.210 | Variable (DD) | | | | |
| 20 | ∞ | 0.90 | 1.51680 | 64.20 | Various filters | |
| 21 | ∞ | | | | | |

Also in Table 5, each of the optical surfaces shown by attaching "*" (asterisk) on their surface numbers, which are the sixth surface, the eleventh surface, the thirteenth surface and the nineteenth surface, are aspheric surfaces. The parameters of each of the aspheric surfaces with respect to the formula (1) are as follows:

Aspheric surface: Sixth Surface
K=0.0,
$A_4 = 3.85002 \times 10^{-4}$,
$A_6 = -1.10780 \times 10^{-5}$,
$A_8 = 2.35785 \times 10^{-7}$,
$A_{10} = -2.34160 \times 10^{-9}$ Aspheric surface: Eleventh Surface
K=0.0,
$A_4 = -8.87320 \times 10^{-5}$,
$A_6 = -1.27509 \times 10^{-5}$,
$A_8 = 3.86587 \times 10^{-7}$,
$A_{10} = -1.51651 \times 10^{-8}$ Aspheric surface: Thirteenth Surface
K=0.0,
$A_4 = -1.86002 \times 10^{-4}$,
$A_6 = 6.08479 \times 10^{-6}$,
$A_8 = -3.29644 \times 10^{-7}$,
$A_{10} = 7.59412 \times 10^{-9}$ Aspheric surface: Nineteenth Surface
K=0.0,
$A_4 = 9.53034 \times 10^{-4}$,
$A_6 = 1.41904 \times 10^{-5}$,
$A_8 = 5.62952 \times 10^{-7}$,
$A_{10} = -2.39245 \times 10^{-8}$ The variable interval DA between the first group of the lenses G1 and the second group of the lenses G2, the variable interval DB between the second group of the lenses G2 and the aperture stop FA, the variable interval DC between the aperture stop FA and the third group of the lenses, and the variable interval DD between the third group of the lenses and the optical filter OF are varied in accordance with the zooming as shown in the table below.

TABLE 6

Variable intervals

| | Short focal end | Intermediate focal length | Long focal end |
|---|---|---|---|
| f | 4.430 | 9.508 | 20.408 |
| DA | 1.200 | 7.425 | 15.244 |
| DB | 9.461 | 3.555 | 1.200 |
| DC | 5.981 | 3.181 | 1.000 |
| DD | 6.838 | 9.635 | 11.812 |

In addition, numeric values in the third embodiment that relate to each of the conditional formulas mentioned in the foregoing are as follows:

Numeric Values of Conditional Formulas $$(Y'\max / R_{34I}) = -0.246$$

$$(N_{3O-1}) \times X_{3O}(H_{0.8}) / Y'\max = -0.00178$$

$$\{(N_{3O-1}) \times X_{3O}(H_{0.8}) + (1 - N_{3I}) \times X_{3I}(H_{0.8})\} / Y'\max = -0.00858$$

$$(N_{2O} - 1) \times X_{2O}(H_{0.8}) / Y'\max = 0.01915$$

$$\{(N_{2O} - 1) \times X_{2O}(H_{0.8}) + (1 - N_{2I}) \times X_{2I}(H_{0.8})\} / Y'\max = 0.02159$$

$$(n_{33} - n_{32}) = 0.359$$

$$(v_{32} - v_{33}) = 46.7$$

$$(R_{31O} / R_{32O}) = 1.256$$

Therefore, the numeric values in the third embodiment that relate to each of the conditional formulas mentioned in the foregoing are in the range of that conditional formulas.

Fourth Embodiment

Figure 4A:
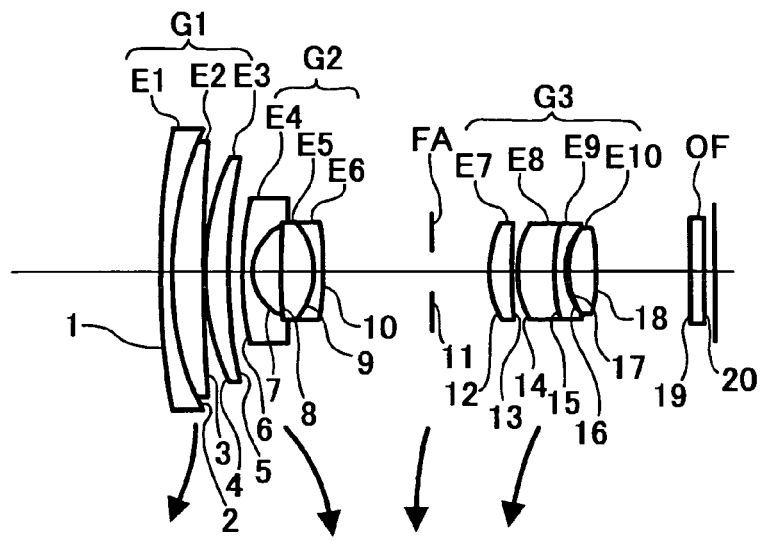
Figure 4B:
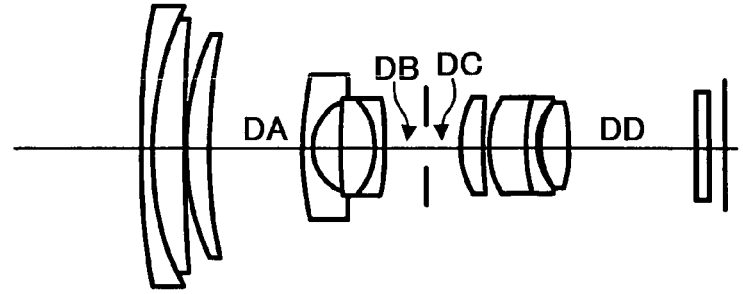
Figure 4C:
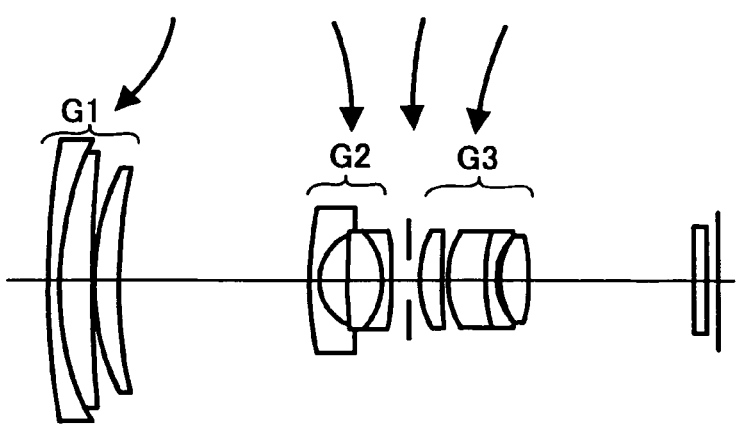

FIGS. 4A to 4C show a configuration of an optical system of a zoom lens according to the fourth embodiment of the present invention, in which FIG. 4A shows a state of the wide-angle end, FIG. 4B shows a state of the intermediate focal length, and FIG. 4C shows a state of the telephoto end.

The zoom lens shown in FIGS. 4A to 4C is provided with a first lens E1, a second lens E2, a third lens E3, a fourth lens E4, a fifth lens E5, a sixth lens E6, a seventh lens E7, an eighth lens E8, a ninth lens E9, a tenth lens E10, an aperture stop FA, and an optical filter OF. In this case, the first lens E1 to the third lens E3 structure a first group of lenses G1, the fourth lens E4 to the sixth lens E6 structure a second group of lenses G2, and the seventh lens E7 to the tenth lens E10 structure a third group of lenses G3. Each group of lenses is supported by an appropriate supporting frame or the like which is common in each group, and each group is operated integrally when the zooming or the like is carried out. FIG. 4A also shows a surface number for each optical surface. Meanwhile, reference numerals used in the fourth embodiment are used independently with respect to the other embodiments, in order to avoid the explanation to be complicated due to increment in number of places of the reference numerals. Therefore, although the reference numerals common to those of FIGS. 1A to 3C are attached in FIGS. 4A to 4C, these do not necessarily represent the structures common to the other embodiments.

As shown in FIGS. 4A to 4C, for example, the first lens E1, the second lens E2, the third lens E3, the fourth lens E4, the fifth lens E5, the sixth lens E6, the aperture stop FA, the seventh lens E7, the eighth lens E8, the ninth lens E9, the tenth lens E10, and the optical filter OF, as the optical components structuring the optical system of the zoom lens, are subsequently arranged in this order from the side of object, such as the subject to be photographed, to the image side, and thereby the image of the subject is imaged behind the optical filter OF having various optical filtering functions.

The first lens E1 is a negative meniscus lens formed in a convex shape that faces its convex surface toward the object side and the second lens E2 is a positive meniscus lens formed in a convex shape that faces its convex surface toward the object side, which are closely contacted and pasted together to be integrally connected, so as to form a cemented lens. In addition, the third lens E3 is a positive meniscus lens formed in a convex shape that faces its convex surface toward the object side. The first group of the lenses G1 structured by these first lens E1 to the third lens E3 has a positive focal length as a whole. The fourth lens E4 is a negative meniscus constituted by a both concave in which a surface facing toward the object side is formed in an aspheric surface and at the same time, the surface facing toward the image side is formed in a strong concave surface.

The fifth lens E5 is a positive lens constituted by a both convex lens in which a surface facing toward the image side is formed in a strong concave surface and the sixth lens E6 is a negative meniscus lens which faces its strong concave surface toward the object side, in which a surface facing toward the image side is formed in an aspheric surface, and which is formed in a convex shape that faces its convex surface toward the image side. These fifth lens E5 and sixth lens E6 are closely contacted and pasted together to be integrally connected, so as to form a cemented lens. The second group of the lenses G2 structured by these fourth lens E4 to the sixth lens E6 has a negative focal length as a whole. More specifically, the second group of the lenses G2 is structured by subsequently arranging the three lenses from the object side to the image side, which are the negative lens E4 facing its surface having a large curvature toward the image side, the positive lens E5 facing its surface having a large curvature toward the image side, and the negative lens E6 facing its surface having a large curvature toward the object side, and both of the surface of the second group of the lenses nearest to the object side and the surface of the second group of the lenses nearest to the image side are in aspheric surfaces. The seventh lens E7 is a positive lens constituted by a both convex lens that faces its strong convex surface constructed by an aspheric surface toward the object side. The eighth lens E8 is a positive meniscus lens formed in a convex shape that faces its strong convex surface toward the object side and the ninth lens E9 is a negative meniscus lens formed in a convex shape that faces its convex surface toward the object side and in which a surface facing toward the image side is in a relatively strong concave surface, which are closely contacted and pasted together to be integrally connected, so as to form a cemented lens. In addition, the tenth lens E10 is a positive lens constituted by a both convex lens which faces its strong convex surface toward the object side and in which a surface facing toward the image side is in an aspheric surface. The third group of the lenses G3 structured by these seventh lens E7 to the tenth lens E10 has a positive focal length as a whole.

That is to say, the third group of the lenses is constructed by subsequently arranging the four lenses from the object side to the image side which comprise the positive lens E7, the cemented lens of the positive lens E8 and the negative lens E9, and the positive lens E10, and both of the surface of the third group of the lenses nearest to the object side and the surface of the third group of the lenses nearest to the image side are in aspheric surfaces.

When the magnification power is carried out from the wide-angle end (i.e., short focal end) to the telephoto end (i.e., long focal end), variable intervals between each of the groups of lenses are varied. More specifically, an interval DA between a surface in the first group of the lenses G1 nearest to the image side, i.e. the surface of the third lens E3 facing toward the image side (surface number 5) and a surface in the second group of the lenses G2 nearest to the object side, i.e. the surface of the fourth lens E4 facing toward the object side (surface number 6), an interval DB between a surface in the second group of the lenses G2 nearest to the image side, i.e. the surface of the sixth lens E6 facing toward the image side (surface number 10) and a surface of the aperture stop FA (surface number 11), an interval DC between the surface of the aperture stop FA (surface number 11) and a surface in the third group of the lenses G3 nearest to the object side, i.e. the surface of the seventh lens E7 facing toward the object side (surface number 12), and an interval DD between a surface in the third group of the lenses G3 nearest to the image side, i.e. the surface of the tenth lens E10 facing toward the image side (surface number 18) and a surface of the optical filter OF facing toward the object side (surface number 19), are varied. Accordingly, the first group of the lenses G1, the second group of the lenses G2, the aperture stop FA and the third group of the lenses G3 are moved such that the interval DA between the first group of the lenses G1 and the second group of the lenses G2 becomes gradually larger and the intervals DB and DC between the second group of the lenses G2 and the third group of the lenses G3 become gradually smaller.

In this fourth embodiment, the focal length of the entire system "f", the F-number "F", and the half field angle "ω" are varied by the zooming within ranges of f=4.42–20.35, F=2.89–4.62 and ω=39.55–9.62, respectively. The open diameter of the aperture stop FA in this case is not varied when the zooming is carried out. The characteristics of each optical surface are shown in the table below.

TABLE 7

Optical characteristics

| Surface number | R | D | Nd | vd | Remarks | |
|---|---|---|---|---|---|---|
| 01 | 56.183 | 0.90 | 1.84666 | 23.78 | First lens | First group |
| 02 | 22.306 | 2.46 | 1.77250 | 49.62 | Second lens | |
| 03 | 129.168 | 0.10 | | | | |
| 04 | 19.540 | 1.90 | 1.77250 | 49.62 | Third lens | |
| 05 | 44.088 | Variable (DA) | | | | |
| 06* | 31.255 | 0.84 | 1.83500 | 42.98 | Fourth lens | Second group |
| 07 | 3.826 | 2.10 | | | | |
| 08 | 143.581 | 2.45 | 1.76182 | 26.61 | Fifth lens | |
| 09 | −5.555 | 0.74 | 1.83500 | 42.98 | Sixth lens | |
| 10* | −39.380 | Variable (DB) | | | | |
| 11 | Aperture stop | Variable (DC) | | | | |
| 12* | 8.333 | 1.80 | 1.58913 | 61.25 | Seventh lens | Third group |
| 13 | −152.107 | 0.23 | | | | |
| 14 | 7.167 | 2.74 | 1.48749 | 70.44 | Eighth lens | |
| 15 | 14.162 | 0.85 | 1.84666 | 23.78 | Ninth lens | |
| 16 | 4.894 | 0.24 | | | | |
| 17 | 5.782 | 2.02 | 1.48749 | 70.44 | Tenth lens | |
| 18* | −13.873 | Variable (DD) | | | | |

TABLE 7-continued

| | Optical characteristics | | | | |
|---|---|---|---|---|---|
| Surface number | R | D | Nd | vd | Remarks |
| 19 | ∞ | 0.90 | 1.51680 | 64.20 | Various filters |
| 20 | ∞ | | | | |

Also in Table 7, each of the optical surfaces shown by attaching "*" (asterisk) on their surface numbers, which are the sixth surface, the tenth surface, the twelfths surface and the eighteenth surface, are aspheric surfaces. The parameters of each of the aspheric surfaces with respect to the formula (1) are as follows:

Aspheric surface: Sixth Surface
  K=0.0,
  $A_4=1.84029\times10^{-4}$,
  $A_6=-4.83681\times10^{-6}$,
  $A_8=1.03688\times10^{-7}$,
  $A_{10}=-1.32922\times10^{-9}$ Aspheric surface: Tenth Surface
  K=0.0,
  $A_4=-5.53512\times10^{-4}$,
  $A_6=-2.57934\times10^{-5}$,
  $A_8=1.05288\times10^{-6}$,
  $A_{10}=-1.31801\times10^{-7}$ Aspheric surface: Twelfth Surface
  K=0.0,
  $A_4=-2.23709\times10^{-4}$,
  $A_6=-8.77690\times10^{-7}$,
  $A_8=3.19167\times10^{-7}$,
  $A_{10}=-1.93115\times10^{-8}$ Aspheric surface: Eighteenth Surface
  K=0.0,
  $A_4=8.00477\times10^{-4}$,
  $A_6=2.50817\times10^{-6}$,
  $A_8=5.14171\times10^{-7}$,
  $A_{10}=-1.09665\times10^{-7}$ The variable interval DA between the first group of the lenses G1 and the second group of the lenses G2, the variable interval DB between the second group of the lenses G2 and the aperture stop FA, the variable interval DC between the aperture stop FA and the third group of the lenses, and the variable interval DD between the third group of the lenses and the optical filter OF are varied in accordance with the zooming as shown in the table below.

TABLE 8

| | Variable intervals | | |
|---|---|---|---|
| | Short focal end | Intermediate focal length | Long focal end |
| f | 4.425 | 9.488 | 20.350 |
| DA | 1.000 | 7.240 | 14.505 |
| DB | 8.095 | 3.256 | 1.200 |
| DC | 4.494 | 2.617 | 1.000 |
| DD | 7.045 | 9.488 | 12.498 |

In addition, numeric values in the fourth embodiment that relate to each of the conditional formulas mentioned in the foregoing are as follows:

Numeric Values of Conditional Formulas $$(Y'\max/R_{34I}) = -0.252$$

$$(N_{3O-1})\times X_{3O}(H_{0.8})/Y'\max = -0.00160$$

$$\{(N_{3O-1})\times X_{3O}(H_{0.8}) + (1-N_{3I})\times X_{3I}(H_{0.8})\}/Y'\max = -0.00587$$

$$(N_{2O}-1)\times X_{2O}(H_{0.8})/Y'\max = 0.00861$$

$$\{(N_{2O}-1)\times X_{2O}(H_{0.8}) + (1-N_{2I})\times X_{2I}(H_{0.8})\}/Y'\max = 0.01593$$

$$(n_{33}-n_{32}) = 0.359$$

$$(v_{32}-v_{33}) = 46.7$$

$$(R_{31O}/R_{32O}) = 1.163$$

Therefore, the numeric values in the fourth embodiment that relate to each of the conditional formulas mentioned in the foregoing are in the range of that conditional formulas.

Figure 5:
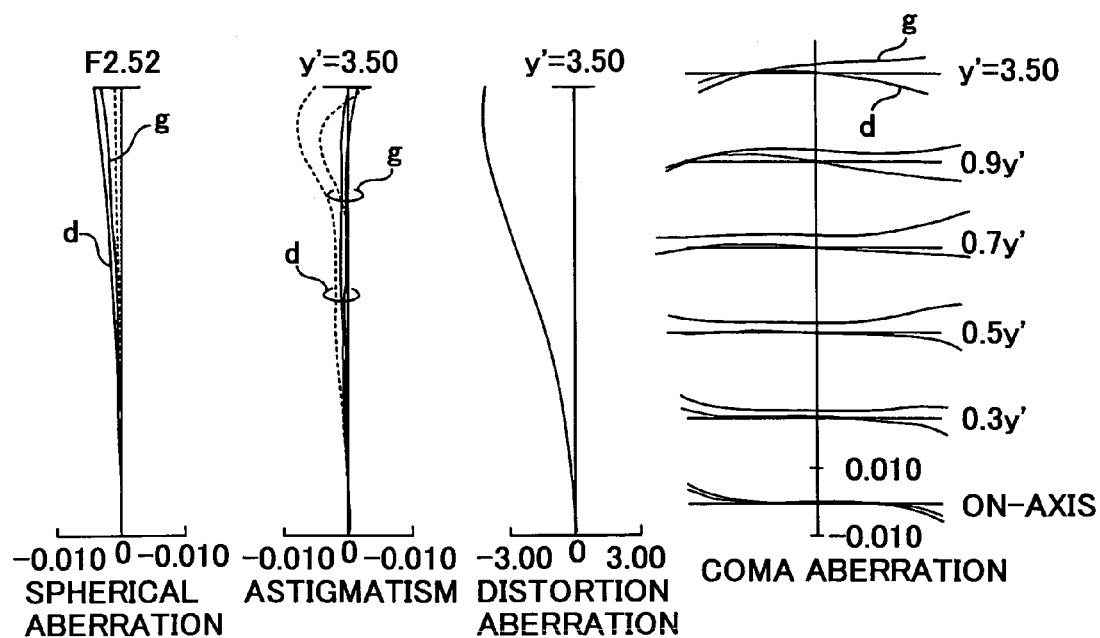
FIG. 5 is an aberration curve diagram showing spherical aberration, astigmatism, distortion aberration and coma aberration in the wide-angle end of the zoom lens according to the first embodiment of the present invention shown in FIGS. 1A to 1C.
Figure 6:
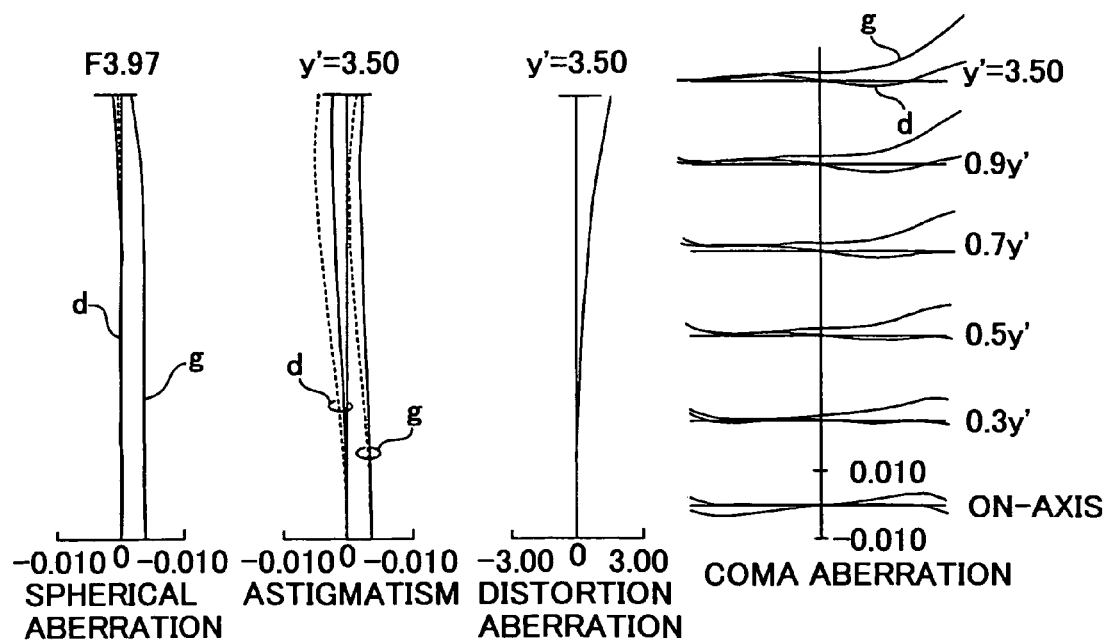
FIG. 6 is an aberration curve diagram showing the spherical aberration, the astigmatism, the distortion aberration and the coma aberration in the intermediate focal length of the zoom lens according to the first embodiment of the present invention shown in FIGS. 1A to 1C.
Figure 7:
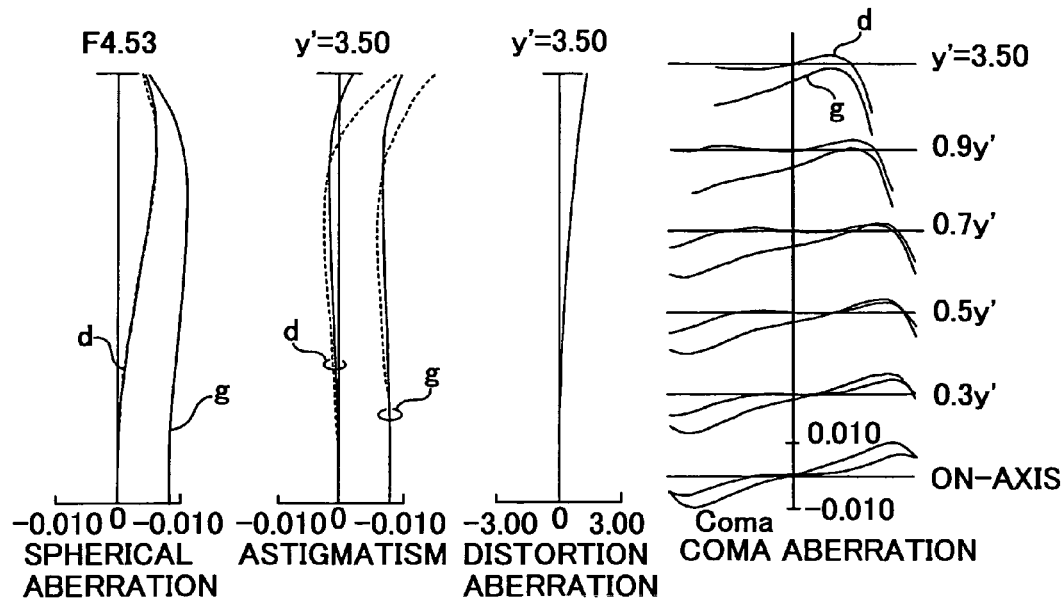
FIG. 7 is an aberration curve diagram showing the spherical aberration, the astigmatism, the distortion aberration and the coma aberration in the telephoto end of the zoom lens according to the first embodiment of the present invention shown in FIGS. 1A to 1C.

FIGS. 5 to 7 are aberration curve diagrams showing spherical aberration, astigmatism, distortion aberration and coma aberration in the zoom lens according to the above-mentioned first embodiment of the present invention shown in FIGS. 1A to 1C, in which FIG. 5 is the aberration curve diagram of the wide-angle end, FIG. 6 is the aberration curve diagram of the intermediate focal length, and FIG. 7 is the aberration curve diagram of the telephoto end. Within each of the aberration curve diagrams, a broken line in each spherical aberration diagram represents a sine condition, a solid line and a broken line in each astigmatism diagram represent sagittal and meridional, respectively, and in addition, a heavy line and a thin line represent a "d" line and a "g" line, respectively.

Figure 8:
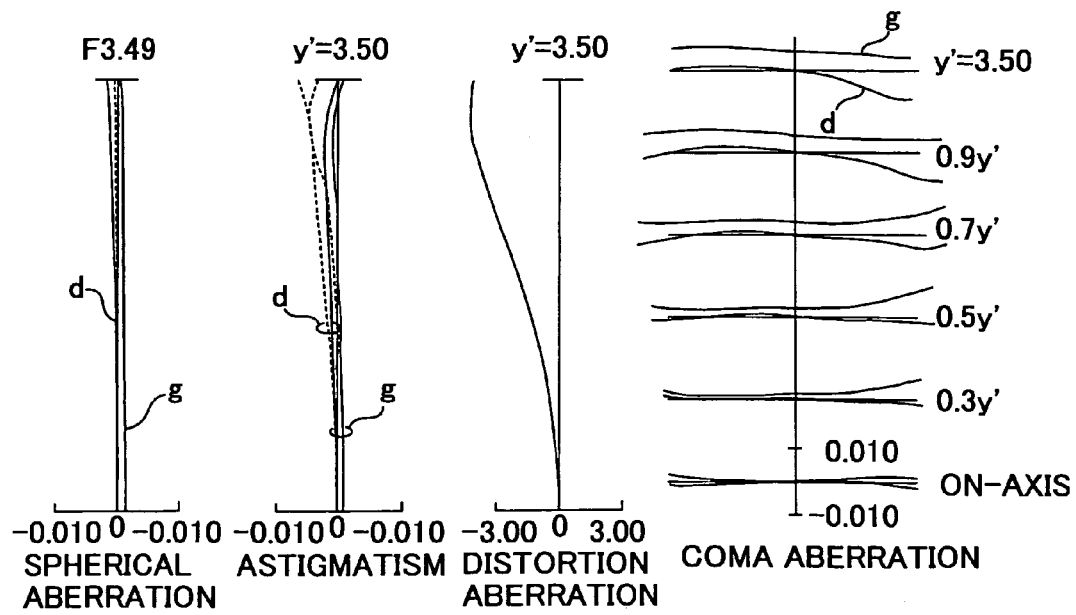
FIG. 8 is an aberration curve diagram showing the spherical aberration, the astigmatism, the distortion aberration and the coma aberration in the wide-angle end of the zoom lens according to the second embodiment of the present invention shown in FIGS. 2A to 2C.
Figure 9:
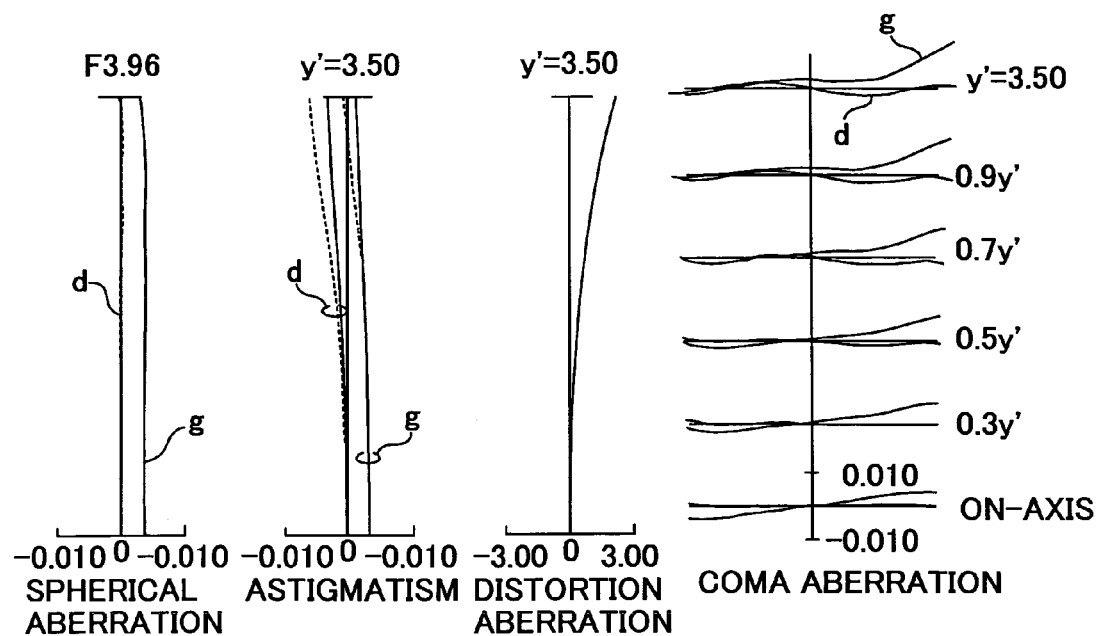
FIG. 9 is an aberration curve diagram showing the spherical aberration, the astigmatism, the distortion aberration and the coma aberration in the intermediate focal length of the zoom lens according to the second embodiment of the present invention shown in FIGS. 2A to 2C.
Figure 10:
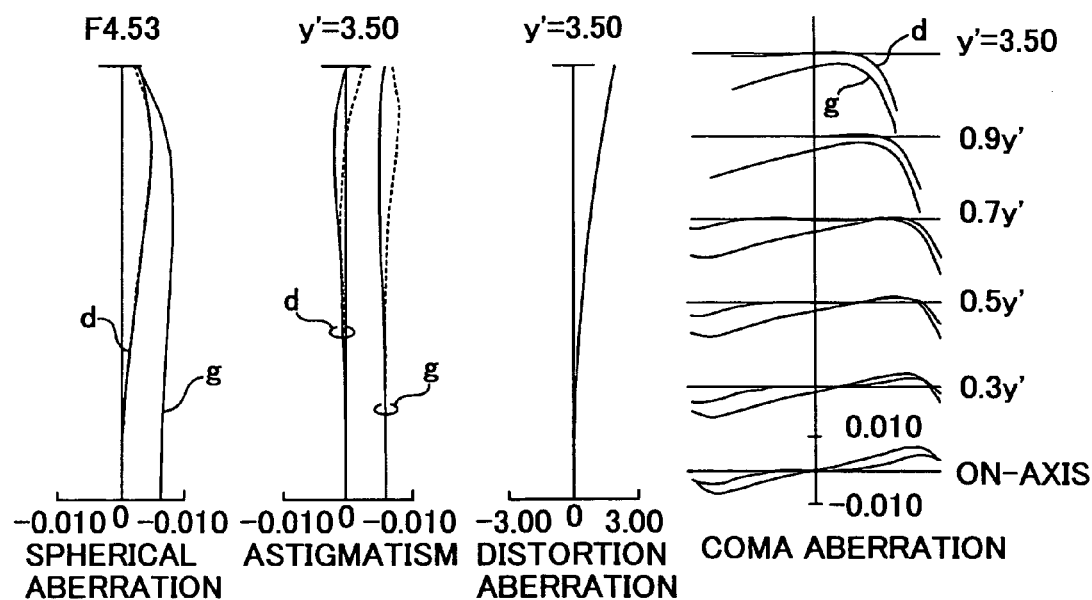
FIG. 10 is an aberration curve diagram showing the spherical aberration, the astigmatism, the distortion aberration and the coma aberration in the telephoto end of the zoom lens according to the second embodiment of the present invention shown in FIGS. 2A to 2C.

FIGS. 8 to 10 are aberration curve diagrams showing spherical aberration, astigmatism, distortion aberration and coma aberration in the zoom lens according to the above-mentioned second embodiment of the present invention shown in FIGS. 2A to 2C, in which FIG. 8 is the aberration curve diagram of the wide-angle end, FIG. 9 is the aberration curve diagram of the intermediate focal length, and FIG. 10 is the aberration curve diagram of the telephoto end. As well as in this case, within each of the aberration curve diagrams, a broken line in each spherical aberration diagram represents a sine condition, a solid line and a broken line in each astigmatism diagram represent sagittal and meridional, respectively, and in addition, a heavy line and a thin line represent a "d" line and a "g" line, respectively.

Figure 11:
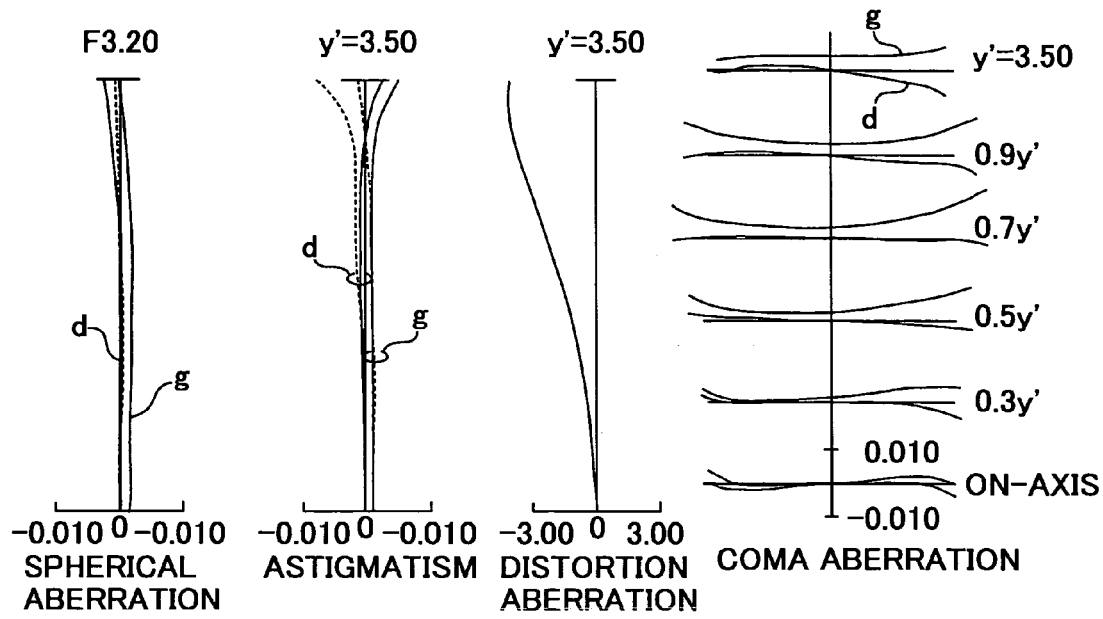
FIG. 11 is an aberration curve diagram showing the spherical aberration, the astigmatism, the distortion aberration and the coma aberration in the wide-angle end of the zoom lens according to the third embodiment of the present invention shown in FIGS. 3A to 3C.
Figure 12:
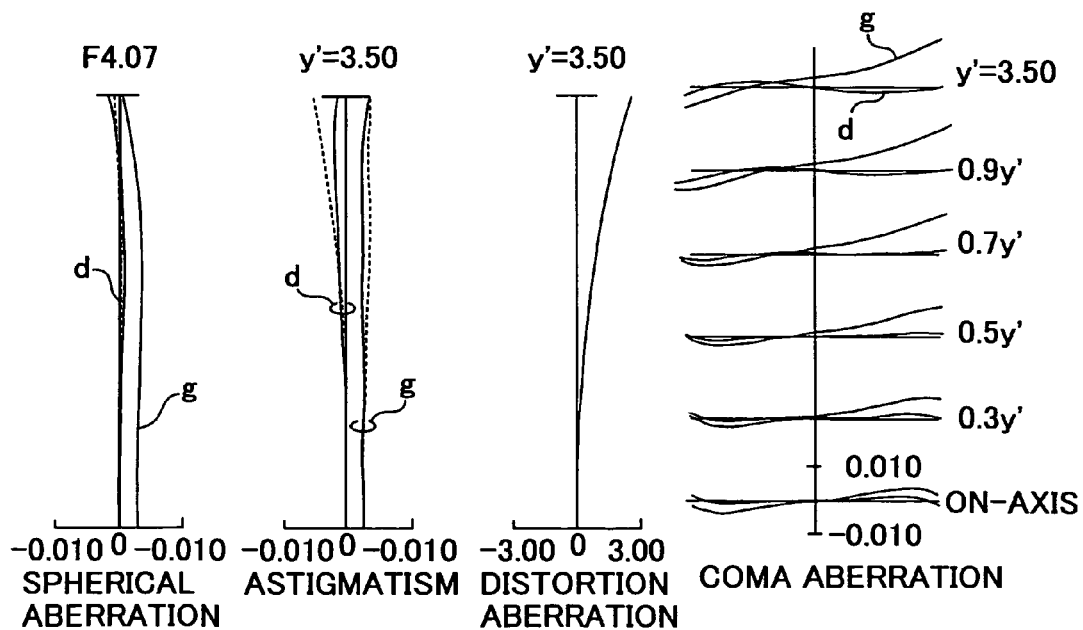
FIG. 12 is an aberration curve diagram showing the spherical aberration, the astigmatism, the distortion aberration and the coma aberration in the intermediate focal length of the zoom lens according to the third embodiment of the present invention shown in FIGS. 3A to 3C.
Figure 13:
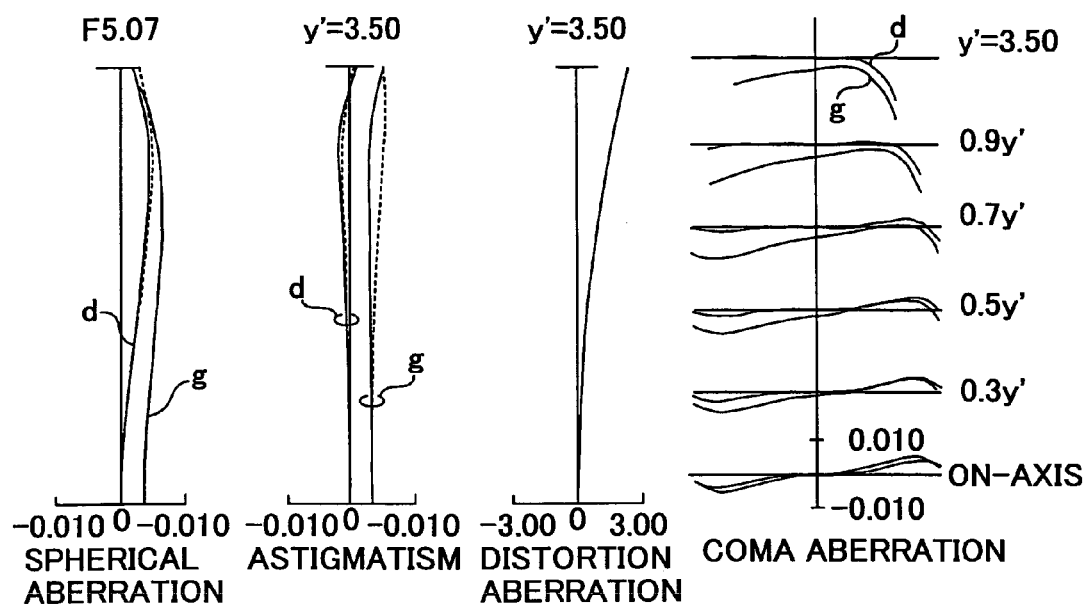
FIG. 13 is an aberration curve diagram showing the spherical aberration, the astigmatism, the distortion aberration and the coma aberration in the telephoto end of the zoom lens according to the third embodiment of the present invention shown in FIGS. 3A to 3C.

FIGS. 11 to 13 are aberration curve diagrams showing spherical aberration, astigmatism, distortion aberration and coma aberration in the zoom lens according to the above-mentioned third embodiment of the present invention shown in FIGS. 3A to 3C, in which FIG. 11 is the aberration curve diagram of the wide-angle end, FIG. 12 is the aberration curve diagram of the intermediate focal length, and FIG. 13 is the aberration curve diagram of the telephoto end. As well as in this case, within each of the aberration curve diagrams, a broken line in each spherical aberration diagram represents a sine condition, a solid line and a broken line in each astigmatism diagram represent sagittal and meridional, respectively, and in addition, a heavy line and a thin line represent a "d" line and a "g" line, respectively.

Figure 14:
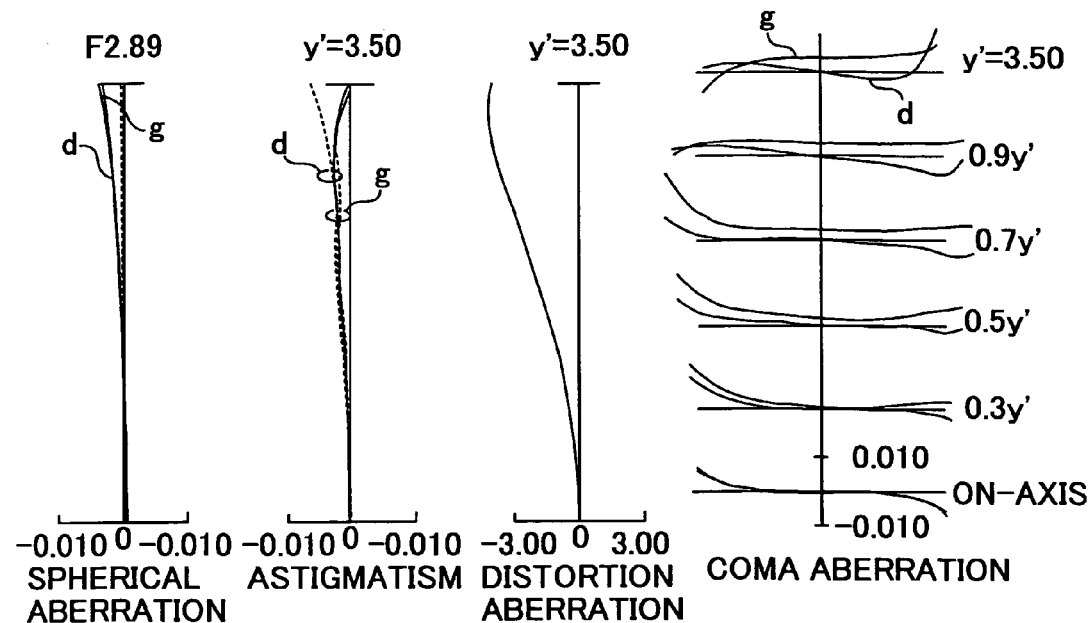
FIG. 14 is an aberration curve diagram showing the spherical aberration, the astigmatism, the distortion aberration and the coma aberration in the wide-angle end of the zoom lens according to the fourth embodiment of the present invention shown in FIGS. 4A to 4C.
Figure 15:
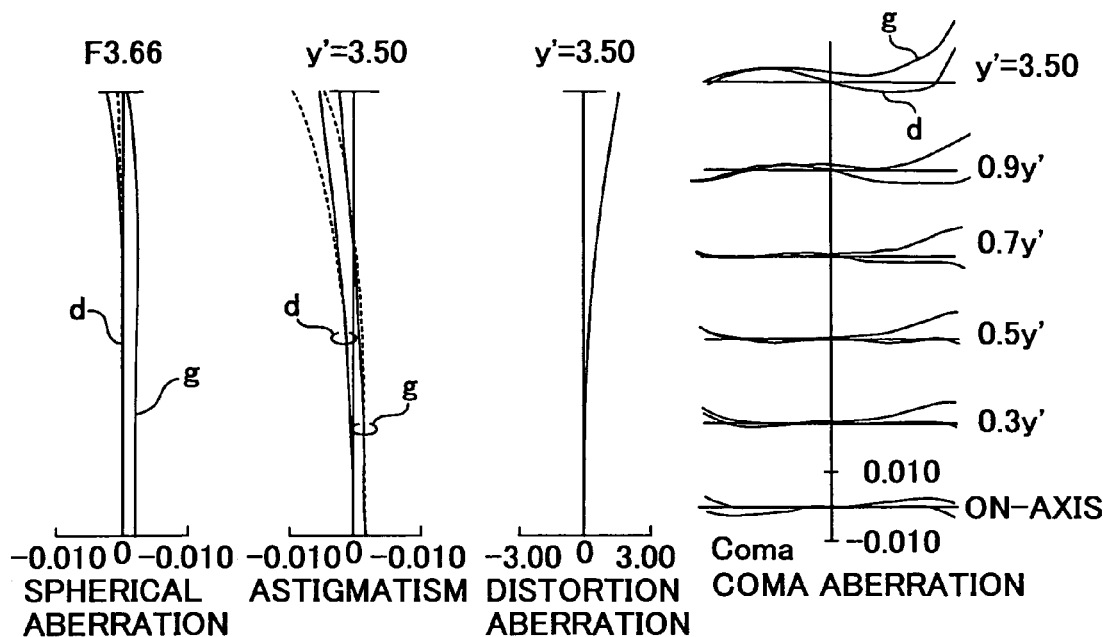
FIG. 15 is an aberration curve diagram showing the spherical aberration, the astigmatism, the distortion aberration and the coma aberration in the intermediate focal length of the zoom lens according to the fourth embodiment of the present invention shown in FIGS. 4A to 4C.
Figure 16:
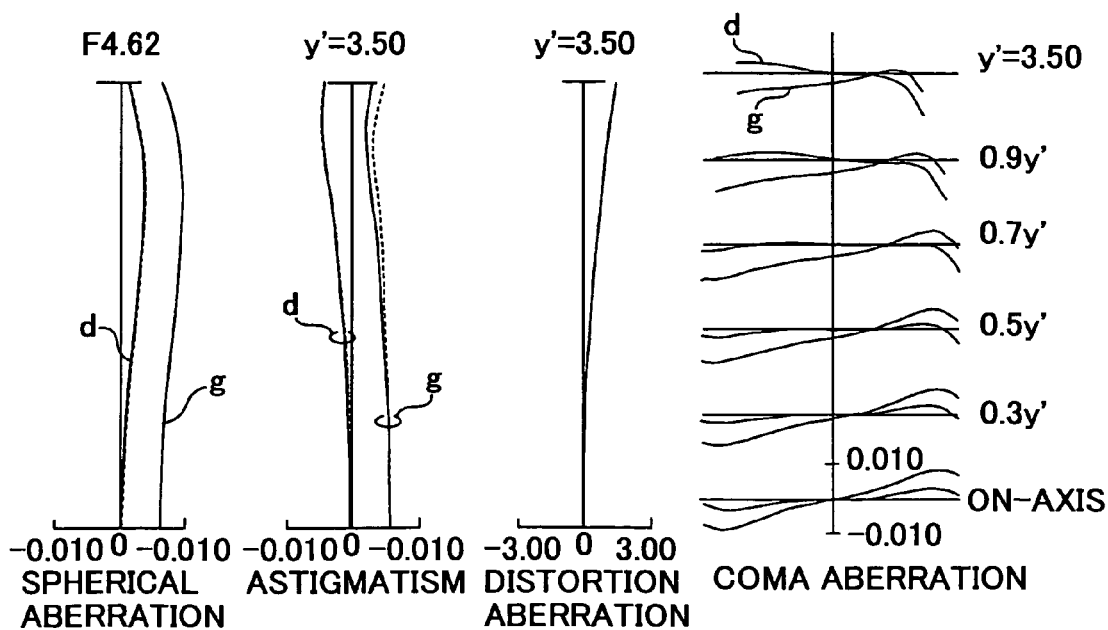
FIG. 16 is an aberration curve diagram showing the spherical aberration, the astigmatism, the distortion aberration and the coma aberration in the telephoto end of the zoom lens according to the fourth embodiment of the present invention shown in FIGS. 4A to 4C.

Additionally, FIGS. 14 to 16 are aberration curve diagrams showing spherical aberration, astigmatism, distortion aberration and coma aberration in the zoom lens according to the above-mentioned fourth embodiment of the present invention shown in FIGS. 4A to 4C, in which FIG. 14 is the aberration curve diagram of the wide-angle end, FIG. 15 is the aberration curve diagram of the intermediate focal length, and FIG. 16 is the aberration curve diagram of the telephoto end. As well as in this case, within each of the aberration curve diagrams, a broken line in each spherical aberration diagram represents a sine condition, a solid line and a broken line in each astigmatism diagram represent sagittal and meridional, respectively, and in addition, a heavy line and a thin line represent a "d" line and a "g" line, respectively.

According to each of the aberration curve diagrams of FIGS. 5 to 16, it is clear that the aberration is well corrected or suppressed in any of the zoom lenses of such structures shown in FIGS. 1A to 4C in accordance with the above-mentioned first to fourth embodiments of the present invention.

Figure 17A:
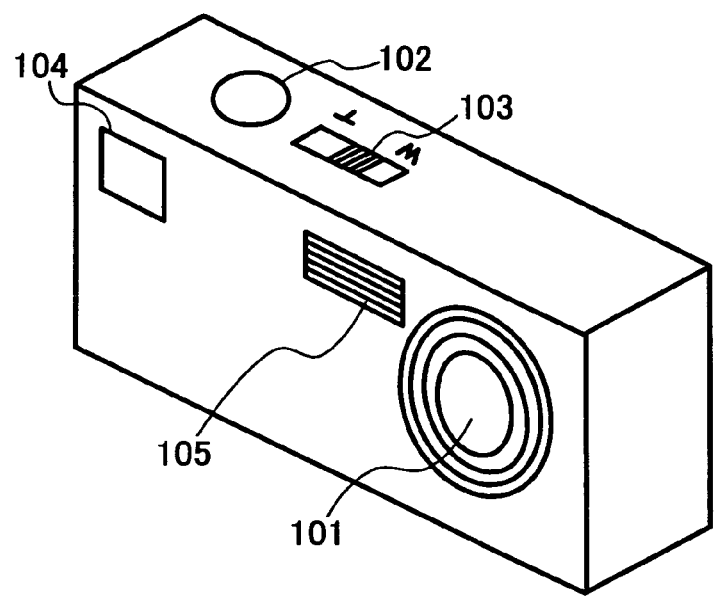
Figure 17B:
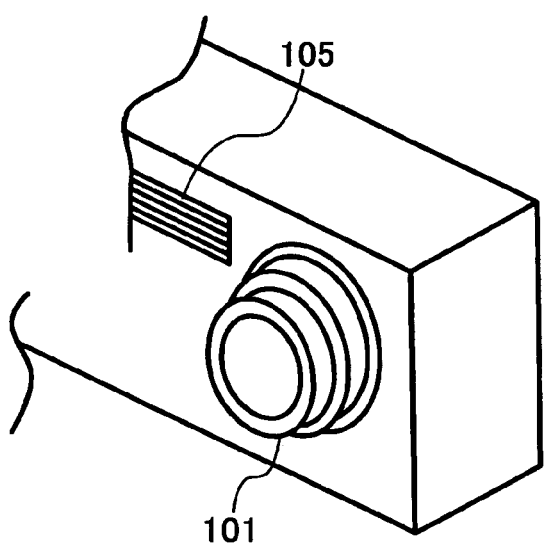
Figure 18:
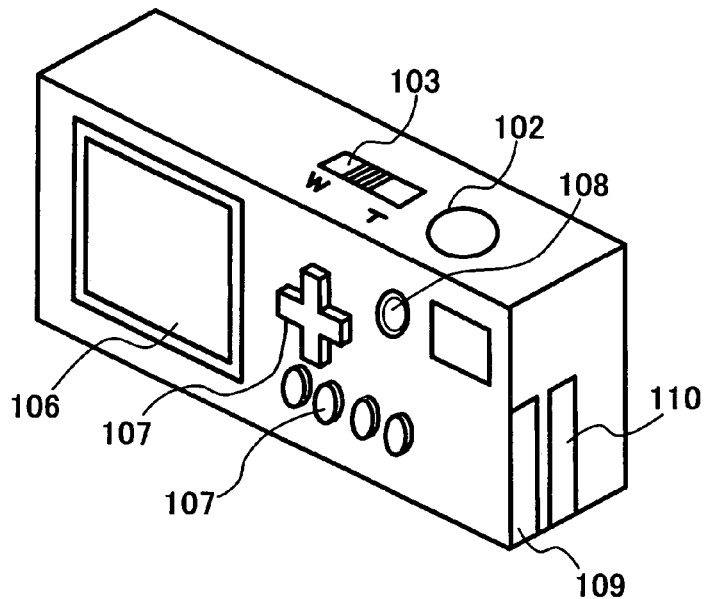
FIG. 18 is a perspective view seen from a photographer's side, for schematically showing the external structure of the camera of FIGS. 17A and 17B.
Figure 19:
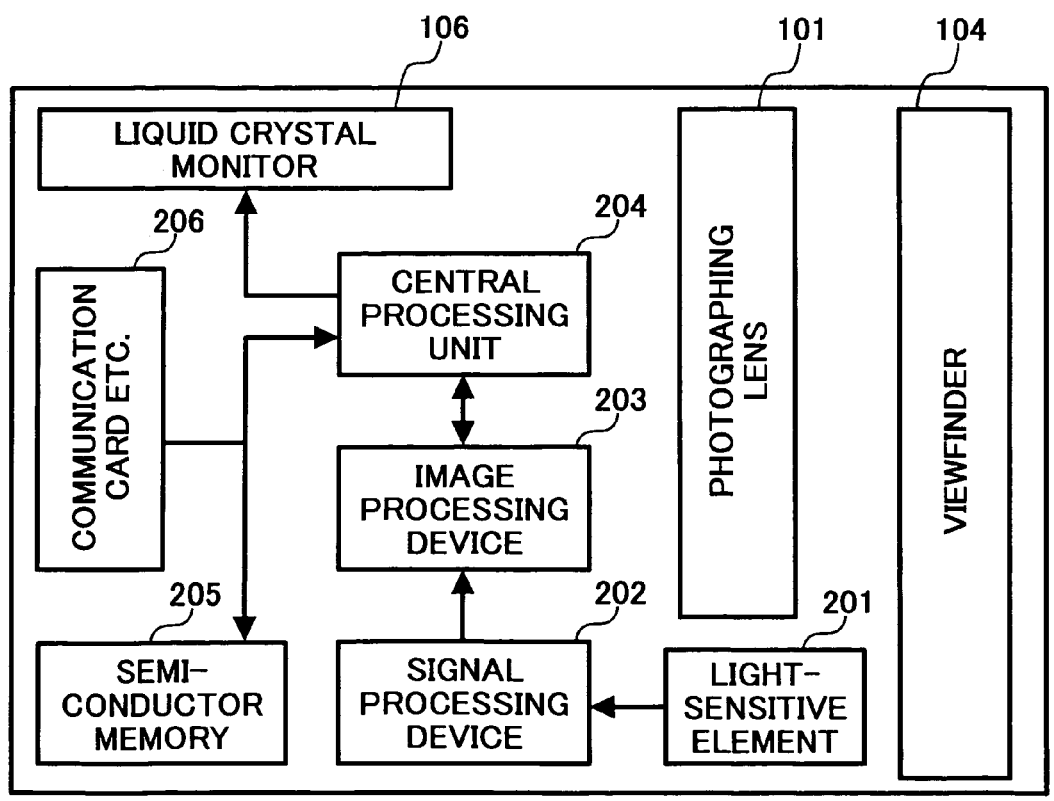
FIG. 19 is a block diagram schematically showing a construction of a function of the camera of FIGS. 17A and 17B.

Next, an embodiment of the present invention having structured a camera by employing such a zoom lens shown in the above-mentioned first to fourth embodiments according to the present invention as a photographing optical system will be described with reference to FIGS. 17A to 19. FIGS. 17A and 17B are perspective views showing an external appearance of the camera seen from a front side, i.e., the side of subject to be photographed, FIG. 18 is a perspective view showing the external appearance of the camera seen from a back side which is a photographer's side, and FIG. 19 is a block diagram showing a construction of a function of the camera. Meanwhile, although description is given here in relation to the camera, there has been introduced in recent years the one in which a camera function is incorporated in a portable information terminal device such as a so-called PDA (Personal Data Assistant) and a portable cellular phone, etc. Such a portable information terminal device has an appearance slightly different from the camera, however, it includes function or configuration which is substantially identical thereto. Therefore, the zoom lens according to the present invention may be employed in such a portable information terminal device.

As shown in FIGS. 17A, 17B and 18, a camera comprises a photographing lens 101, a shutter button 102, a zoom lever 103, a viewfinder 104, a strobe 105, a liquid crystal monitor 106, operating buttons 107, a power switch 108, a memory card slot 109, and a communication card slot 110, and so on. Moreover, as shown in FIG. 19, the camera also comprises a light-sensitive element 201, a signal processing device 202, an image processing device 203, a central processing unit (CPU) 204, a semiconductor memory 205 and a communication card etc. 206.

The camera includes the photographing lens 101 and the light-sensitive element 201 as an area sensor such as a CCD (Charge-Coupled Device) imaging element or the like, and is accordingly configured for reading out an image of the object as the photographing target, i.e., the subject to be photographed, which is formed by the photographing lens 101 as the photographing optical system, by the light-sensitive element 201. The zoom lens according to the present invention explained in the first to fourth embodiments is used as the photographing lens 101. More specifically, a lens unit is constructed, by using lenses or the like as an optical component structuring the zoom lens.

This lens unit includes a mechanism for supporting each of the lenses or the like in such a manner as to be able to move and operate each of the lenses per, at least, group of lenses. The photographing lens 101 which is to be incorporated into the camera is, in a normal case, incorporated therein in a form of the lens unit.

An output of the light-sensitive element 201 is processed by the signal processing device 202 which is controlled by the central processing unit 204, and is converted into digital image information. A predetermined image process is applied by the image processing device 203, which is also controlled by the central processing unit 204, to the image information digitalized by the signal processing device 202, and the image information is, thereafter, stored to the semiconductor memory 205 such as a nonvolatile memory. In this case, the semiconductor memory 205 may be a memory card loaded in the memory card slot 109, or a semiconductor memory embedded in a camera main body. The liquid crystal monitor 106 is capable of displaying the image of the subject subjected to photographing, and also capable of displaying an image stored in the semiconductor memory 205. In addition, the image stored in the semiconductor memory 205 can also be transmitted externally through the communication card etc. 206 loaded in the communication card slot 110.

As shown in FIG. 17A, the photographing lens 101 is embedded in a body of the camera in a sunk state when the camera is carried. When the user operates the power switch 108 to apply the power, the lens barrel is protruded as shown in FIG. 17B, thereby the lens barrel is configured to be protruded from the body of the camera. At this time, for example, the optical system in each group structuring the zoom lens is arranged in the wide-angle end in the lens barrel of the photographing lens 101, and when the zoom lever 103 is operated in such a state, the arrangement of the optical system in each group is altered, thereby making it possible to carry out the magnification power operation in which the optical system in each group is arranged to be in the telephoto end. Meanwhile, it is desirable that an optical system of the viewfinder 104 is also configured to carry out the magnification power in conjunction with a change in the field angle of the photographing lens 101.

In many cases, focusing is carried out by a half-pressing operation of the shutter button 102. The focusing in the zoom lens according to the present invention which is in positive-negative-positive three-group structure (the zoom lenses defined in the present inventions and the embodiments (1) to (9), or shown in the first to fourth embodiments) can be carried out by a movement of the first group of the lenses G1 or a movement of the second group of the lenses G2 for example. The photographing is carried out when the shutter button 102 is further pressed down to be in a fully pressed state, and the above-mentioned processes are carried out thereafter.

When displaying the image stored in the semiconductor memory 205 on the liquid crystal monitor 106 or transmitting it externally through the communication card etc. 206, the operating buttons 107 are operated in a predetermined manner. The semiconductor memory 205 and the communication card etc. 206 are used by loading them respectively in an exclusive-use or general purpose slot such as the memory card slot 109 and the communication card slot 110, etc.

Meanwhile, each of the groups of lenses in the zoom lens do not necessarily have to be aligned on the optical axis when the photographing lens 101 is in the sunk state. For example, it is possible to realize further establishment of making the camera thin if such a mechanism is employed in which the third group of the lenses G3 is evacuated from the optical axis at the time of the sunk state and the first group of the lenses G1 and the second group of the lenses G2 are stored in parallel.

As already mentioned in the foregoing, it is possible to use the photographing lens 101 constructed by the lens unit utilizing the zoom lens as shown in the first to fourth embodiments as the photographing optical system in such a camera or portable information terminal device described above. Accordingly, it is possible to realize the camera or portable information terminal device having high image quality and which is small in size that uses the light-sensitive element of 3 million to 5 million pixels class.

Therefore, according to the present invention, it is possible to provide the zoom lens, which has the sufficient wide angle field in the wide-angle end and the high magnification power capable of sufficiently covering the normal photographing range, small in size and has the high resolving power, comprising the first group of the lenses having the positive focal length, the second group of the lenses having the negative focal length and the third group of the lenses having the positive focal length which are subsequently arranged from the object side to the image side, and having the aperture stop provided between the second group of the lenses and the third group of the lenses, and in accordance with the changes in the magnification power as the zoom lens shifts from the wide-angle end to the telephoto end, at least the first group of the lenses and the third group of the lenses are moved such that the interval between the first group of the lenses and the second group of the lenses becomes gradually larger and the interval between the second group of the lenses and the third group of the lenses becomes gradually smaller, and to provide the lens unit, the camera and the portable information terminal device using such a zoom lens.

More specifically, the zoom lens according to the present invention comprises the first group of the lenses, the second group of the lenses and the third group of the lenses which are subsequently arranged from the object side to the image side; the first group of the lenses has the positive focal length, the second group of the lenses has the negative focal length and the third group of the lenses has the positive focal length; and the aperture stop provided between the second group of the lenses and the third group of the lenses, wherein at least the first group of the lenses and the third group of the lenses are moved in accordance with the changes in the magnification power as the zoom lens shifts from the wide-angle end to the telephoto end, such that the interval between the first group of the lenses and the second group of the lenses becomes gradually larger and the interval between the second group of the lenses and the third group of the lenses becomes gradually smaller; the third group of the lenses is constructed by subsequently arranging those four lenses from the object side to the image side which comprise the positive lens, the cemented lens of the positive lens and the negative lens, and the positive lens, both of the surface of the third group of the lenses nearest to the object side and the surface of the third group of the lenses nearest to the image side are so aspheric that the positive refractive power becomes gradually weaker as the location of the third group of the lenses departs from the optical axis, and the following conditional formula is satisfied:

$$-0.5 < (Y' \max / R_{34I}) < 0.0$$

where $R_{34I}$ is the curvature radius of the surface of the third group of the lenses nearest to the image side, and Y' max is the maximum image height.

According to this present invention, it is possible to provide the zoom lens capable of, in particular, obtaining the sufficient wide angle field in which the half field angle of the wide-angle end is over 38 degrees, which has the magnification power of over 4.5 times, small in size, and capable of obtaining the resolving power corresponding to the imaging device having the number of pixels of more than 3 million to 5 million pixels.

Also, the zoom lens of the embodiment (1), in accordance with the present invention, satisfies the following conditional formula:

$$-0.0250 < (N_{3O}-1) \times X_{3O}(H_{0.8})/Y' \max < -0.0005$$

$$-0.0500 < \{(N_{3O}-1) \times X_{3O}(H_{0.8}) + (1-N_{3I}) \times X_{3I}(H_{0.8})\}/Y' \max < -0.0010$$

where the refractive index of the lens positioned nearest to the object side of the third group of the lenses is $N_{3O}$, the refractive index of the lens positioned nearest to the image side of the third group of the lenses is $N_{3I}$, the aspheric surface quantity within 80% of the maximum light ray effective height in the aspheric surface which is nearest to the object side of the third group of the lenses is represented as $X_{3O}(H_{0.8})$ and the aspheric surface quantity within 80% of the maximum light ray effective height in the aspheric surface which is nearest to the image side of the third group of the lenses is represented as $X_{3I}(H_{0.8})$, provided that the difference in sag amount between the spherical surface defined by the paraxial curvature of the aspheric surface and the actual aspheric surface at the height H from the optical axis is represented by the aspheric surface quantity X(H), taking the direction from the object side to the image side positive.

According to this embodiment, it is possible to provide the zoom lens capable of, in particular, obtaining the high performance by compensating each aberration in the better manner.

According to the zoom lens of the embodiment (2), in addition to the present invention or the embodiment (1), the second group of the lenses comprises at least two negative lenses and one positive lens, and both of the surface of the second group of the lenses nearest to the object side and the surface of the second group of the lenses nearest to the image side are so aspheric that negative refractive power becomes gradually weaker as the location of the second group of the lenses departs from the optical axis. According to this embodiment, it is possible to provide the zoom lens capable of, in particular, obtaining the higher performance by compensating the off-axis aberration in the better manner that tends to be increased in accordance with the widening of the field angle.

The zoom lens of the embodiment (3), in accordance with the embodiment (2), satisfies the following conditional formula:

$$0.0020 < (N_{2O}-1) \times X_{2O}(H_{0.8})/Y' \max < 0.1000$$

$$0.0030 < \{(N_{2O}-1) \times X_{2O}(H_{0.8}) + (1-N_{2I}) \times X_{2I}(H_{0.8})\}/Y' \max < 0.1500$$

where the refractive index of the lens positioned nearest to the object side of the second group of the lenses is $N_{2O}$, the refractive index of the lens positioned nearest to the image side of the second group of the lenses is $N_{2I}$, the aspheric surface quantity within 80% of the maximum light ray effective height in the aspheric surface which is nearest to the object side of the second group of the lenses is represented as $X_{2O}(H_{0.8})$ and the aspheric surface quantity within 80% of the maximum light ray effective height in the aspheric surface which is nearest to the image side of the second group of the lenses is represented as $X_{2I}(H_{0.8})$, provided that the difference in sag amount between the spherical surface defined by the paraxial curvature of the aspheric surface and the actual aspheric surface at the height H from the optical axis is represented by the aspheric surface quantity X (H), taking the direction from the object side to the image side positive. According to this embodiment, it is possible to provide to the zoom lens capable of, in particular, obtaining the higher performance by compensating the off-axis aberration in even better manner.

The zoom lens of the embodiment (4), in accordance with the present invention or any one of the embodiments (1) to (3), satisfies the following conditional formula:

$$0.28<(n_{33}-n_{32})<0.40$$

$$30.0<(\nu_{32}-\nu_{33})<60.0$$

where the refractive index of the positive lens of the cemented lens of the third group of the lenses is $n_{32}$, the refractive index of the negative lens of the cemented lens of the third group of the lenses is $n_{33}$, the Abbe number of the positive lens of the cemented lens of the third group of the lenses is $\nu_{32}$, and the Abbe number of the negative lens of the cemented lens of the third group of the lenses is $\nu_{33}$. According to this embodiment, it is possible to provide the zoom lens capable of, in particular, obtaining the fine balance between the monochromatic aberration and the chromatic aberration to obtain even higher performance.

The zoom lens of the embodiment (5), in accordance with the present invention or any one of the embodiments (1) to (4), satisfies the following conditional formula:

$$0.25<(R_{31O}/R_{32O})<1.5$$

where the curvature radius of the object side surface of the positive lens positioned nearest to the object side of the third group of the lenses is $R_{31O}$, and the curvature radius of the surface of the cemented lens of the third group of the lenses nearest to the object side is $R_{32O}$. According to the present invention, it is possible to provide the zoom lens in which, in particular, the imaging performance at the peripheral part is easy to secure, taking into account the sensitivity caused by the manufacturing error, and which is thereby capable of obtaining even higher performance.

The zoom lens according to the present invention comprises the first group of the lenses, the second group of the lenses and the third group of the lenses which are subsequently arranged from the object side to the image side; the first group of the lenses has the positive focal length, the second group of the lenses has the negative focal length and the third group of the lenses has the positive focal length; and the aperture stop provided between the second group of the lenses and the third group of the lenses, wherein at least the first group of the lenses and the third group of the lenses are moved in accordance with the changes in the magnification power as the zoom lens shifts from the wide-angle end to the telephoto end, such that the interval between the first group of the lenses and the second group of the lenses becomes gradually larger and the interval between the second group of the lenses and the third group of the lenses becomes gradually smaller, the second group of the lenses comprises at least two negative lenses and one positive lens, and both of the surface of the second group of the lenses nearest to the object side and the surface of the second group of the lenses nearest to the image side are so aspheric that negative refractive power becomes gradually weaker as the location of the second group of the lenses departs from the optical axis. According to this invention, it is possible to provide the zoom lens capable of, in particular, obtaining the sufficient wide angle field in which the half field angle of the wide-angle end is over 38 degrees, which has the magnification power of over 4.5 times, small in size, and capable of obtaining the resolving power corresponding to the imaging device having the number of pixels of more than 3 million to 5 million pixels.

The zoom lens of the embodiment (6), in accordance with the present invention, satisfies the following conditional formula:

$$0.0020<(N_{2O}-1)\times X_{2O}(H_{0.8})/Y\,\text{max}<0.1000$$

$$0.0030<\{(N_{2O}-1)\times X_{2O}(H_{0.8})+(1-N_{2I})\times X_{2I}(H_{0.8})\}/Y\,\text{max}<0.1500$$

where the refractive index of the lens positioned nearest to the object side of the second group of the lenses is $N_{2O}$, the refractive index of the lens positioned nearest to the image side of the second group of the lenses is $N_{2I}$, the aspheric surface quantity within 80% of the maximum light ray effective height in the aspheric surface which is nearest to the object side of the second group of the lenses is represented as $X_{2O}(H_{0.8})$ and the aspheric surface quantity within 80% of the maximum light ray effective height in the aspheric surface which is nearest to the image side of the second group of the lenses is represented as $X_{2I}(H_{0.8})$, provided that the difference in sag amount between the spherical surface defined by the paraxial curvature of the aspheric surface and the actual aspheric surface at the height H from the optical axis is represented by the aspheric surface quantity X (H), taking the direction from the object side to the image side positive.

According to this embodiment, it is possible to provide the zoom lens capable of, in particular, obtaining higher performance by compensating the off-axis aberration in even better manner.

According to the zoom lens of the embodiment (7), in addition to any one of the present inventions or any one of the embodiments (1) to (6), the second group of the lenses is constructed by subsequently arranging three lenses from the object side to the image side, which are the negative lens facing the surface having the large curvature toward the image side, the negative lens facing the surface having the large curvature toward the image side, and the positive lens facing the surface having the large curvature toward the object side. According to this embodiment, it is possible to provide the zoom lens capable of, in particular, obtaining even higher performance by means of specific structure.

According to the zoom lens of the embodiment (8), in addition to any one of the present inventions or any one of the embodiments (1) to (6), the second group of the lenses is constructed by subsequently arranging three lenses from the object side to the image side, which are the negative lens facing the surface having the large curvature toward the image side, the positive lens facing the surface having the large curvature toward the image side, and the negative lens facing the surface having the large curvature toward the object side. According to this embodiment, it is possible to provide the zoom lens capable of, in particular, obtaining even higher performance by means of another specific structure.

According to the zoom lens of the embodiment (9), in addition to any one of the present inventions or any one of the embodiments (1) to (8), the position of the aperture stop is fixed with respect to the image plane when the magnification power is carried out, and the second group of the lenses is moved in accordance with the magnification power. According to this embodiment, it is possible to provide the zoom lens in which, in particular, the structure is simpler and which is capable of easily securing the dynamic performance.

Also, the lens unit according to the present invention comprises the optical system including the zoom lens according to any one of the present inventions or any one of the embodiments (1) to (9); and the mechanism for supporting each optical component structuring the optical system and moving the each optical component at least per group of the lenses. According to the present invention, it is possible to provide the lens unit capable of, in particular, obtaining the sufficient wide angle field in which the half field angle of the wide-angle end is over 38 degrees, which has the magnification power of over 4.5 times, small in size, and capable of obtaining the resolving power corresponding to the imaging device having the number of pixels of more than 3 million to 5 million pixels.

Also, the camera according to the present invention comprises the zoom lens according to any one of the present inventions or any one of the embodiments (1) to (9) as the photographing optical system. According to the present invention, it is possible to provide the camera which is, in particular, small in size and superior in portability, and capable of obtaining the high image quality by means of the high resolving power, by using the zoom lens capable of obtaining the sufficient wide angle field in which the half field angle of the wide-angle end is over 38 degrees, which has the magnification power of over 4.5 times, small in size, and capable of obtaining the resolving power corresponding to the imaging device having the number of pixels of more than 3 million to 5 million pixels.

Also, the portable information terminal device according to the present invention comprises the zoom lens according to any one of the present inventions or any one of the embodiments (1) to (9) as the photographing optical system of the camera function portion.

According to the present invention, it is possible to provide the portable information terminal device which is, in particular, small in size and superior in portability, and capable of obtaining the high image quality by means of the high resolving power, by using the zoom lens capable of obtaining the sufficient wide angle field in which the half field angle of the wide-angle end is over 38 degrees, which has the magnification power of over 4.5 times, small in size, and capable of obtaining the resolving power corresponding to the imaging device having the number of pixels of more than 3 million to 5 million pixels.

Although the invention has been described in its preferred form with a certain degree of particularity, obviously many changes and variations are possible therein. It is therefore to be understood that the present invention may be practiced otherwise than as specified herein without departing from the scope and spirit thereof.

What is claimed is:

1. A zoom lens, comprising:
a first group of lenses, a second group of lenses and a third group of lenses which are subsequently arranged from an object side to an image side;
said first group of the lenses having a positive focal length, said second group of the lenses having a negative focal length and said third group of the lenses having a positive focal length; and
an aperture stop provided between said second group of the lenses and said third group of the lenses, wherein
at least said first group of the lenses and said third group of the lenses are moved in accordance with changes in magnification power as the zoom lens shifts from a wide-angle end to a telephoto end, such that an interval between said first group of the lenses and said second group of the lenses becomes gradually larger and an interval between said second group of the lenses and said third group of the lenses becomes gradually smaller,
said third group of the lenses is constructed by subsequently arranging those four lenses from the object side to the image side which comprise a positive lens, a cemented lens of a positive lens and a negative lens, and a positive lens,
both of a surface of said third group of the lenses nearest to the object side and a surface of said third group of the lenses nearest to the image side are so aspheric that positive refractive power becomes gradually weaker as a location of the third group of the lenses departs from an optical axis, and
a following conditional formula is satisfied:

$$-0.5 < (Y' \max / R_{34I}) < 0.0$$

where $R_{34I}$ is a curvature radius of the surface of said third group of the lenses nearest to the image side, and Y' max is a maximum image height.

2. The zoom lens according to claim 1, wherein a following conditional formula is satisfied:

$$-0.0250 < (N_{3O}-1) \times X_{3O}(H_{0.8})/Y' \max < -0.0005$$

$$-0.0500 < \{(N_{3O}-1) \times X_{3O}(H_{0.8}) + (1-N_{3I}) \times X_{3I}(H_{0.8})\}/Y' \max < -0.0010$$

where a refractive index of the lens positioned nearest to the object side of said third group of the lenses is $N_{3O}$, a refractive index of the lens positioned nearest to the image side of said third group of the lenses is $N_{3I}$, an aspheric surface quantity within 80% of a maximum light ray effective height in the aspheric surface which is nearest to the object side of said third group of the lenses is represented as $X_{3O}$ ($H_{0.8}$) and an aspheric surface quantity within 80% of a maximum light ray effective height in the aspheric surface which is nearest to the image side of said third group of the lenses is represented as $X_{3I}$ ($H_{0.8}$), provided that a difference in sag amount between a spherical surface defined by a paraxial curvature of an aspheric surface and an actual aspheric surface at a height H from the optical axis is represented by an aspheric surface quantity X (H), taking a direction from the object side to the image side positive.

3. The zoom lens according to claim 1, wherein said second group of the lenses comprises at least two negative lenses and one positive lens, and both of a surface of said second group of the lenses nearest to the object side and a surface of said second group of the lenses nearest to the image side are so aspheric that negative refractive power becomes gradually weaker as a location of the second group of the lenses departs from the optical axis.

4. The zoom lens according to claim 2, wherein said second group of the lenses comprises at least two negative lenses and one positive lens, and both of a surface of said second group of the lenses nearest to the object side and a surface of said second group of the lenses nearest to the image side are so aspheric that negative refractive power becomes gradually weaker as a location of the second group of the lenses departs from the optical axis.

5. The zoom lens according to claim 3, wherein a following conditional formula is satisfied:

$$0.0020 < (N_{2O}-1) \times X_{2O}(H_{0.8})/Y_{max} < 0.1000$$

$$0.0030 < \{(N_{2O}-1) \times X_{2O}(H_{0.8}) + (1-N_{2I}) \times X_{2I}(H_{0.8})\}/Y_{max} < 0.1500$$

where a refractive index of a lens positioned nearest to the object side of said second group of the lenses is $N_{2O}$, a refractive index of a lens positioned nearest to the image side of said second group of the lenses is $N_{2I}$, an aspheric surface quantity within 80% of a maximum light ray effective height in the aspheric surface which is nearest to the object side of said second group of the lenses is represented as $X_{2O}$ ($H_{0.8}$) and an aspheric surface quantity within 80% of a maximum light ray effective height in the aspheric surface which is nearest to the image side of said second group of the lenses is represented as $X_{2I}$ ($H_{0.8}$), provided that a difference in sag amount between a spherical surface defined by a paraxial curvature of an aspheric surface and an actual aspheric surface at a height H from the optical axis is represented by an aspheric surface quantity X (H), taking a direction from the object side to the image side positive.

6. The zoom lens according to claim 4, wherein a following conditional formula is satisfied:

$$0.0020 < (N_{2O}-1) \times X_{2O}(H_{0.8})/Y_{max} < 0.1000$$

$$0.0030 < \{(N_{2O}-1) \times X_{2O}(H_{0.8}) + (1-N_{2I}) \times X_{2I}(H_{0.8})\}/Y_{max} < 0.1500$$

where a refractive index of a lens positioned nearest to the object side of said second group of the lenses is $N_{2O}$, a refractive index of a lens positioned nearest to the image side of said second group of the lenses is $N_{2I}$, an aspheric surface quantity within 80% of a maximum light ray effective height in the aspheric surface which is nearest to the object side of said second group of the lenses is represented as $X_{2O}$ ($H_{0.8}$) and an aspheric surface quantity within 80% of a maximum light ray effective height in the aspheric surface which is nearest to the image side of said second group of the lenses is represented as $X_{2I}$ ($H_{0.8}$), provided that a difference in sag amount between a spherical surface defined by a paraxial curvature of an aspheric surface and an actual aspheric surface at a height H from the optical axis is represented by an aspheric surface quantity X (H), taking a direction from the object side to the image side positive.

7. The zoom lens according to claim 1, wherein a following conditional formula is satisfied:

$$0.28 < (n_{33}-n_{32}) < 0.40$$

$$30.0 < (v_{32}-v_{33}) < 60.0$$

where a refractive index of the positive lens of the cemented lens of said third group of the lenses is $n_{32}$, a refractive index of the negative lens of the cemented lens of said third group of the lenses is $n_{33}$, an Abbe number of the positive lens of the cemented lens of said third group of the lenses is $v_{32}$, and an Abbe number of the negative lens of the cemented lens of said third group of the lenses is $v_{33}$.

8. The zoom lens according to claim 2, wherein a following conditional formula is satisfied:

$$0.28 < (n_{33}-n_{32}) < 0.40$$

$$30.0 < (v_{32}-v_{33}) < 60.0$$

where a refractive index of the positive lens of the cemented lens of said third group of the lenses is $n_{32}$, a refractive index of the negative lens of the cemented lens of said third group of the lenses is $n_{33}$, an Abbe number of the positive lens of the cemented lens of said third group of the lenses is $v_{32}$, and an Abbe number of the negative lens of the cemented lens of said third group of the lenses is $v_{33}$.

9. The zoom lens according to claim 3, wherein a following conditional formula is satisfied:

$$0.28 < (n_{33}-n_{32}) < 0.40$$

$$30.0 < (v_{32}-v_{33}) < 60.0$$

where a refractive index of the positive lens of the cemented lens of said third group of the lenses is $n_{32}$, a refractive index of the negative lens of the cemented lens of said third group of the lenses is $n_{33}$, an Abbe number of the positive lens of the cemented lens of said third group of the lenses is $v_{32}$, and an Abbe number of the negative lens of the cemented lens of said third group of the lenses is $v_{33}$.

10. The zoom lens according to claim 4, wherein a following conditional formula is satisfied:

$$0.28 < (n_{33}-n_{32}) < 0.40$$

$$30.0 < (v_{32}-v_{33}) < 60.0$$

where a refractive index of the positive lens of the cemented lens of said third group of the lenses is $n_{32}$, a refractive index of the negative lens of the cemented lens of said third group of the lenses is $n_{33}$, an Abbe number of the positive lens of the cemented lens of said third group of the lenses is $v_{32}$, and an Abbe number of the negative lens of the cemented lens of said third group of the lenses is $v_{33}$.

11. The zoom lens according to claim 5, wherein a following conditional formula is satisfied:

$$0.28 < (n_{33}-n_{32}) < 0.40$$

$$30.0 < (v_{32}-v_{33}) < 60.0$$

where a refractive index of the positive lens of the cemented lens of said third group of the lenses is $n_{32}$, a refractive index of the negative lens of the cemented lens of said third group of the lenses is $n_{33}$, an Abbe number of the positive lens of the cemented lens of said third group of the lenses is $v_{32}$, and an Abbe number of the negative lens of the cemented lens of said third group of the lenses is $v_{33}$.

12. The zoom lens according to claim 6, wherein a following conditional formula is satisfied:

$$0.28 < (n_{33}-n_{32}) < 0.40$$

$$30.0 < (v_{32}-v_{33}) < 60.0$$

where a refractive index of the positive lens of the cemented lens of said third group of the lenses is $n_{32}$, a refractive index of the negative lens of the cemented lens of said third group of the lenses is $n_{33}$, an Abbe number of the positive lens of the cemented lens of said third group of the lenses is $v_{32}$, and an Abbe number of the negative lens of the cemented lens of said third group of the lenses is $v_{33}$.

13. The zoom lens according to claim 1, wherein a following conditional formula is satisfied:

$$0.25<(R_{31O}/R_{32O})<1.5$$

where a curvature radius of the object side surface of the positive lens positioned nearest to the object side of said third group of the lenses is $R_{31O}$, and a curvature radius of a surface of the cemented lens of said third group of the lenses nearest to the object side is $R_{32O}$.

14. The zoom lens according to claim 2, wherein a following conditional formula is satisfied:

$$0.25<(R_{31O}/R_{32O})<1.5$$

where a curvature radius of the object side surface of the positive lens positioned nearest to the object side of said third group of the lenses is $R_{31O}$, and a curvature radius of a surface of the cemented lens of said third group of the lenses nearest to the object side is $R_{32O}$.

15. The zoom lens according to claim 3, wherein a following conditional formula is satisfied:

$$0.25<(R_{31O}/R_{32O})<1.5$$

where a curvature radius of the object side surface of the positive lens positioned nearest to the object side of said third group of the lenses is $R_{31O}$, and a curvature radius of a surface of the cemented lens of said third group of the lenses nearest to the object side is $R_{32O}$.

16. The zoom lens according to claim 4, wherein a following conditional formula is satisfied:

$$0.25<(R_{31O}/R_{32O})<1.5$$

where a curvature radius of the object side surface of the positive lens positioned nearest to the object side of said third group of the lenses is $R_{31O}$, and a curvature radius of a surface of the cemented lens of said third group of the lenses nearest to the object side is $R_{32O}$.

17. The zoom lens according to claim 5, wherein a following conditional formula is satisfied:

$$0.25<(R_{31O}/R_{32O})<1.5$$

where a curvature radius of the object side surface of the positive lens positioned nearest to the object side of said third group of the lenses is $R_{31O}$, and a curvature radius of a surface of the cemented lens of said third group of the lenses nearest to the object side is $R_{32O}$.

18. The zoom lens according to claim 6, wherein a following conditional formula is satisfied:

$$0.25<(R_{31O}/R_{32O})<1.5$$

where a curvature radius of the object side surface of the positive lens positioned nearest to the object side of said third group of the lenses is $R_{31O}$, and a curvature radius of a surface of the cemented lens of said third group of the lenses nearest to the object side is $R_{32O}$.

19. The zoom lens according to claim 7, wherein a following conditional formula is satisfied:

$$0.25<(R_{31O}/R_{32O})<1.5$$

where a curvature radius of the object side surface of the positive lens positioned nearest to the object side of said third group of the lenses is $R_{31O}$, and a curvature radius of a surface of the cemented lens of said third group of the lenses nearest to the object side is $R_{32O}$.

20. The zoom lens according to claim 8, wherein a following conditional formula is satisfied:

$$0.25<(R_{31O}/R_{32O})<1.5$$

where a curvature radius of the object side surface of the positive lens positioned nearest to the object side of said third group of the lenses is $R_{31O}$, and a curvature radius of a surface of the cemented lens of said third group of the lenses nearest to the object side is $R_{32O}$.

21. The zoom lens according to claim 9, wherein a following conditional formula is satisfied:

$$0.25<(R_{31O}/R_{32O})<1.5$$

where a curvature radius of the object side surface of the positive lens positioned nearest to the object side of said third group of the lenses is $R_{31O}$, and a curvature radius of a surface of the cemented lens of said third group of the lenses nearest to the object side is $R_{32O}$.

22. The zoom lens according to claim 10, wherein a following conditional formula is satisfied:

$$0.25<(R_{31O}/R_{32O})<1.5$$

where a curvature radius of the object side surface of the positive lens positioned nearest to the object side of said third group of the lenses is $R_{31O}$, and a curvature radius of a surface of the cemented lens of said third group of the lenses nearest to the object side is $R_{32O}$.

23. The zoom lens according to claim 11, wherein a following conditional formula is satisfied:

$$0.25<(R_{31O}/R_{32O})<1.5$$

where a curvature radius of the object side surface of the positive lens positioned nearest to the object side of said third group of the lenses is $R_{31O}$, and a curvature radius of a surface of the cemented lens of said third group of the lenses nearest to the object side is $R_{32O}$.

24. The zoom lens according to claim 12, wherein a following conditional formula is satisfied:

$$0.25<(R_{31O}/R_{32O})<1.5$$

where a curvature radius of the object side surface of the positive lens positioned nearest to the object side of said third group of the lenses is $R_{31O}$, and a curvature radius of a surface of the cemented lens of said third group of the lenses nearest to the object side is $R_{32O}$.

25. A zoom lens, comprising:
a first group of lenses, a second group of lenses and a third group of lenses which are subsequently arranged from an object side to an image side;
said first group of the lenses having a positive focal length, said second group of the lenses having a negative focal length and said third group of the lenses having a positive focal length; and
an aperture stop provided between said second group of the lenses and said third group of the lenses, wherein
at least said first group of the lenses and said third group of the lenses are moved in accordance with changes in magnification power as the zoom lens shifts from a wide-angle end to a telephoto end, such that an interval between said first group of the lenses and said second group of the lenses becomes gradually larger and an interval between said second group of the lenses and said third group of the lenses becomes gradually smaller,
said second group of the lenses comprises at least two negative lenses and one positive lens, and both of a surface of said second group of the lenses nearest to the object side and a surface of said second group of the lenses nearest to the image side are so aspheric that negative refractive power becomes gradually weaker as a location of the second group of the lenses departs from an optical axis.

26. The zoom lens according to claim 25, wherein a following conditional formula is satisfied:

$$0.0020 < (N_{2O}-1) \times X_{2O}(H_{0.8})/Y\text{max} < 0.1000$$

$$0.0030 < \{(N_{2O}-1) \times X_{2O}(H_{0.8}) + (1-N_{2I}) \times X_{2I}(H_{0.8})\}/Y\text{max} < 0.1500$$

where a refractive index of a lens positioned nearest to the object side of said second group of the lenses is $N_{2O}$, a refractive index of a lens positioned nearest to the image side of said second group of the lenses is $N_{2I}$, an aspheric surface quantity within 80% of a maximum light ray effective height in the aspheric surface which is nearest to the object side of said second group of the lenses is represented as $X_{2O}$ ($H_{0.8}$) and an aspheric surface quantity within 80% of a maximum light ray effective height in the aspheric surface which is nearest to the image side of said second group of the lenses is represented as $X_{2I}$ ($H_{0.8}$), provided that a difference in sag amount between a spherical surface defined by a paraxial curvature of an aspheric surface and an actual aspheric surface at a height H from the optical axis is represented by an aspheric surface quantity X (H), taking a direction from the object side to the image side positive.

27. The zoom lens according to claim 1, wherein said second group of the lenses is constructed by subsequently arranging three lenses from the object side to the image side, which are a negative lens facing a surface having a large curvature toward the image side, a negative lens facing a surface having a large curvature toward the image side, and a positive lens facing a surface having a large curvature toward the object side.

28. The zoom lens according to claim 2, wherein said second group of the lenses is constructed by subsequently arranging three lenses from the object side to the image side, which are a negative lens facing a surface having a large curvature toward the image side, a negative lens facing a surface having a large curvature toward the image side, and a positive lens facing a surface having a large curvature toward the object side.

29. The zoom lens according to claim 3, wherein said second group of the lenses is constructed by subsequently arranging three lenses from the object side to the image side, which are a negative lens facing a surface having a large curvature toward the image side, a negative lens facing a surface having a large curvature toward the image side, and a positive lens facing a surface having a large curvature toward the object side.

30. The zoom lens according to claim 5, wherein said second group of the lenses is constructed by subsequently arranging three lenses from the object side to the image side, which are a negative lens facing a surface having a large curvature toward the image side, a negative lens facing a surface having a large curvature toward the image side, and a positive lens facing a surface having a large curvature toward the object side.

31. The zoom lens according to claim 7, wherein said second group of the lenses is constructed by subsequently arranging three lenses from the object side to the image side, which are a negative lens facing a surface having a large curvature toward the image side, a negative lens facing a surface having a large curvature toward the image side, and a positive lens facing a surface having a large curvature toward the object side.

32. The zoom lens according to claim 13, wherein said second group of the lenses is constructed by subsequently arranging three lenses from the object side to the image side, which are a negative lens facing a surface having a large curvature toward the image side, a negative lens facing a surface having a large curvature toward the image side, and a positive lens facing a surface having a large curvature toward the object side.

33. The zoom lens according to claim 25, wherein said second group of the lenses is constructed by subsequently arranging three lenses from the object side to the image side, which are a negative lens facing a surface having a large curvature toward the image side, a negative lens facing a surface having a large curvature toward the image side, and a positive lens facing a surface having a large curvature toward the object side.

34. The zoom lens according to claim 26, wherein said second group of the lenses is constructed by subsequently arranging three lenses from the object side to the image side, which are a negative lens facing a surface having a large curvature toward the image side, a negative lens facing a surface having a large curvature toward the image side, and a positive lens facing a surface having a large curvature toward the object side.

35. The zoom lens according to claim 1, wherein said second group of the lenses is constructed by subsequently arranging three lenses from the object side to the image side, which are a negative lens facing a surface having a large curvature toward the image side, a positive lens facing a surface having a large curvature toward the image side, and a negative lens facing a surface having a large curvature toward the object side.

36. The zoom lens according to claim 2, wherein said second group of the lenses is constructed by subsequently arranging three lenses from the object side to the image side, which are a negative lens facing a surface having a large curvature toward the image side, a positive lens facing a surface having a large curvature toward the image side, and a negative lens facing a surface having a large curvature toward the object side.

37. The zoom lens according to claim 3, wherein said second group of the lenses is constructed by subsequently arranging three lenses from the object side to the image side, which are a negative lens facing a surface having a large curvature toward the image side, a positive lens facing a surface having a large curvature toward the image side, and a negative lens facing a surface having a large curvature toward the object side.

38. The zoom lens according to claim 5, wherein said second group of the lenses is constructed by subsequently arranging three lenses from the object side to the image side, which are a negative lens facing a surface having a large curvature toward the image side, a positive lens facing a surface having a large curvature toward the image side, and a negative lens facing a surface having a large curvature toward the object side.

39. The zoom lens according to claim 7, wherein said second group of the lenses is constructed by subsequently arranging three lenses from the object side to the image side, which are a negative lens facing a surface having a large curvature toward the image side, a positive lens facing a surface having a large curvature toward the image side, and a negative lens facing a surface having a large curvature toward the object side.

40. The zoom lens according to claim 13, wherein said second group of the lenses is constructed by subsequently arranging three lenses from the object side to the image side, which are a negative lens facing a surface having a large curvature toward the image side, a positive lens facing a surface having a large curvature toward the image side, and a negative lens facing a surface having a large curvature toward the object side.

41. The zoom lens according to claim 25, wherein said second group of the lenses is constructed by subsequently arranging three lenses from the object side to the image side, which are a negative lens facing a surface having a large curvature toward the image side, a positive lens facing a surface having a large curvature toward the image side, and a negative lens facing a surface having a large curvature toward the object side.

42. The zoom lens according to claim 26, wherein said second group of the lenses is constructed by subsequently arranging three lenses from the object side to the image side, which are a negative lens facing a surface having a large curvature toward the image side, a positive lens facing a surface having a large curvature toward the image side, and a negative lens facing a surface having a large curvature toward the object side.

43. The zoom lens according to claim 1, wherein a position of said aperture stop is fixed with respect to an image plane when the magnification power is carried out, and said second group of the lenses is moved in accordance with the magnification power.

44. The zoom lens according to claim 2, wherein a position of said aperture stop is fixed with respect to an image plane when the magnification power is carried out, and said second group of the lenses is moved in accordance with the magnification power.

45. The zoom lens according to claim 3, wherein a position of said aperture stop is fixed with respect to an image plane when the magnification power is carried out, and said second group of the lenses is moved in accordance with the magnification power.

46. The zoom lens according to claim 5, wherein a position of said aperture stop is fixed with respect to an image plane when the magnification power is carried out, and said second group of the lenses is moved in accordance with the magnification power.

47. The zoom lens according to claim 7, wherein a position of said aperture stop is fixed with respect to an image plane when the magnification power is carried out, and said second group of the lenses is moved in accordance with the magnification power.

48. The zoom lens according to claim 13, wherein a position of said aperture stop is fixed with respect to an image plane when the magnification power is carried out, and said second group of the lenses is moved in accordance with the magnification power.

49. The zoom lens according to claim 25, wherein a position of said aperture stop is fixed with respect to an image plane when the magnification power is carried out, and said second group of the lenses is moved in accordance with the magnification power.

50. The zoom lens according to claim 26, wherein a position of said aperture stop is fixed with respect to an image plane when the magnification power is carried out, and said second group of the lenses is moved in accordance with the magnification power.

51. The zoom lens according to claim 27, wherein a position of said aperture stop is fixed with respect to an image plane when the magnification power is carried out, and said second group of the lenses is moved in accordance with the magnification power.

52. The zoom lens according to claim 35, wherein a position of said aperture stop is fixed with respect to an image plane when the magnification power is carried out, and said second group of the lenses is moved in accordance with the magnification power.

53. A camera, including the zoom lens according to any one of claims 1 to 52 as a photographing optical system.

54. A portable information terminal device, including the zoom lens according to any one of claims 1 to 52 as a photographing optical system of a camera function portion.

* * * * *